United States Patent
Onishi et al.

(10) Patent No.: US 12,328,566 B2
(45) Date of Patent: Jun. 10, 2025

(54) INFORMATION PROCESSING DEVICE, INFORMATION PROCESSING TERMINAL, INFORMATION PROCESSING METHOD, AND PROGRAM

(71) Applicants: Sony Group Corporation, Tokyo (JP); Sony Interactive Entertainment Inc., Tokyo (JP)

(72) Inventors: Takuto Onishi, Tokyo (JP); Kazunobu Ookuri, Tokyo (JP); Hiroaki Shinohara, Tokyo (JP); Asako Tomura, Tokyo (JP); Satsuki Sato, Tokyo (JP)

(73) Assignees: Sony Group Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 209 days.

(21) Appl. No.: 18/024,577

(22) PCT Filed: Sep. 10, 2021

(86) PCT No.: PCT/JP2021/033280
§ 371 (c)(1),
(2) Date: Mar. 3, 2023

(87) PCT Pub. No.: WO2022/054900
PCT Pub. Date: Mar. 17, 2022

(65) Prior Publication Data
US 2023/0362571 A1 Nov. 9, 2023

(30) Foreign Application Priority Data
Sep. 10, 2020 (JP) .................... 2020-152419

(51) Int. Cl.
*H04S 7/00* (2006.01)

(52) U.S. Cl.
CPC .......... *H04S 7/302* (2013.01); *H04S 2420/01* (2013.01)

(58) Field of Classification Search
CPC .. H04R 5/033; H04R 27/00; H04R 2227/003; H04S 7/302; H04S 2400/11;
(Continued)

(56) References Cited

U.S. PATENT DOCUMENTS

2010/0215164 A1* 8/2010 Sandgren ............. H04M 3/568
381/310
2020/0114834 A1 4/2020 Endo et al.

FOREIGN PATENT DOCUMENTS

JP H11-331992 A 11/1999
JP 2020-060696 A 4/2020

OTHER PUBLICATIONS

International Search Report and English translation thereof mailed Nov. 22, 2021 in connection with International Application No. PCT/JP2021/033280.

* cited by examiner

*Primary Examiner* — Paul Kim
(74) *Attorney, Agent, or Firm* — Wolf, Greenfield & Sacks, P.C.

(57) ABSTRACT

An information processing device according to an aspect of the present technology includes a storage unit that stores HRTF data corresponding to a plurality of positions based on a listening position; and a sound image localization processing unit that performs a sound image localization process on sound data of an utterer by using the HRTF data according to an utterance situation of a participant participating in a conversation via a network. The present technology can be applied to a computer that performs remote conference.

11 Claims, 21 Drawing Sheets

(58) Field of Classification Search
CPC .............. H04S 2420/01; H04M 3/568; H04M 2242/30; H04N 7/157; H04N 21/233; H04N 21/4788
USPC ........................................................ 381/303
See application file for complete search history.

FIG.12

PARTICIPANT INFORMATION

· USER INFORMATION
· POSITIONAL INFORMATION
· SETTING INFORMATION
  (BACKGROUND SOUND, ETC.)
· VOLUME INFORMATION

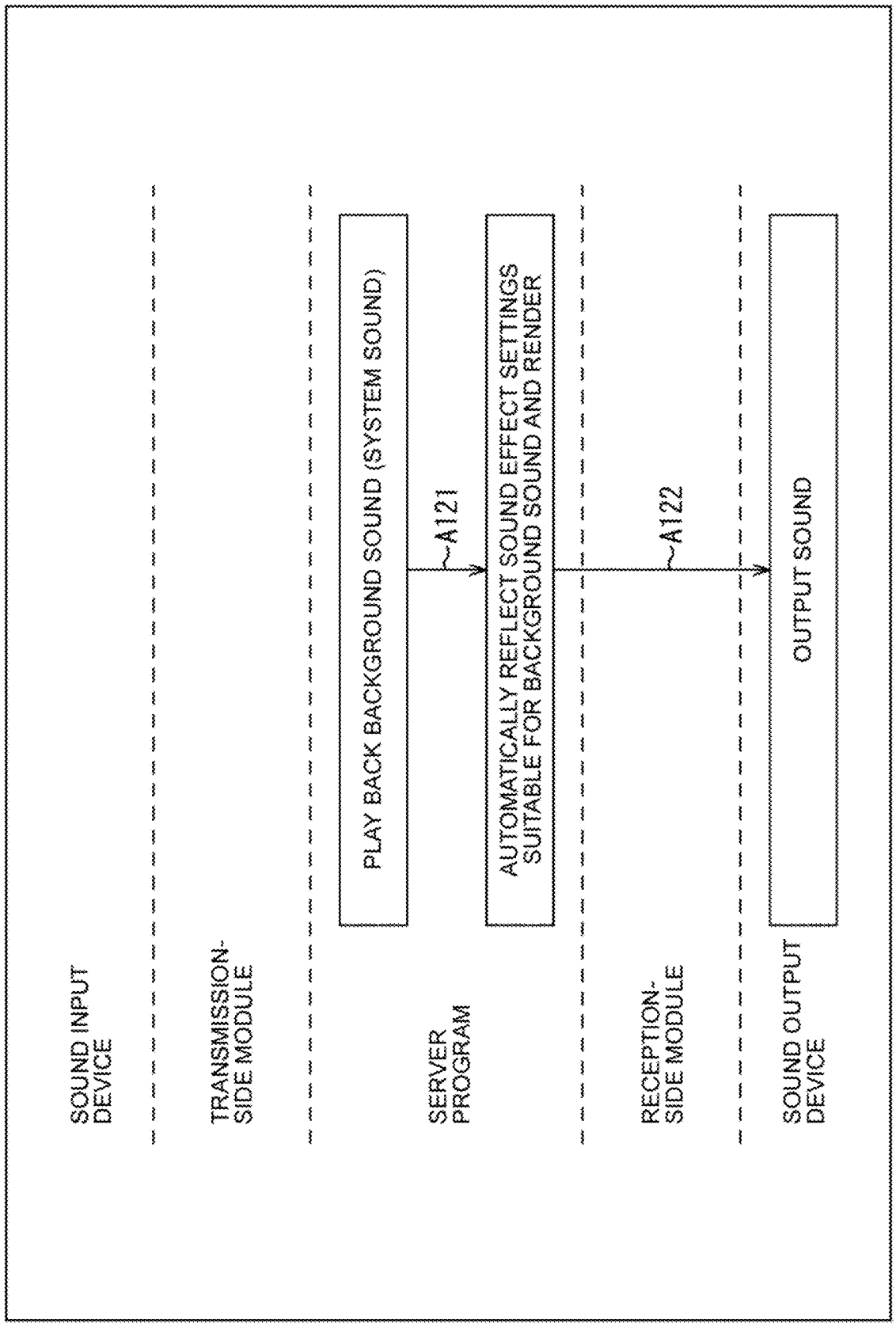

INFORMATION PROCESSING DEVICE, INFORMATION PROCESSING TERMINAL, INFORMATION PROCESSING METHOD, AND PROGRAM

CROSS REFERENCE TO RELATED APPLICATIONS

This is a U.S. National Stage Application under 35 U.S.C. § 371, based on International Application No. PCT/JP2021/033280, filed Sep. 10, 2021, which claims priority to Japanese Patent Application JP 2020-152419, filed Sep. 10, 2020, each of which is hereby incorporated by reference in its entirety.

FIELD

The present technology particularly relates to an information processing device, an information processing terminal, an information processing method, and a program that make an utterance voice easy to hear according to an utterance situation.

BACKGROUND

A so-called remote conference in which a plurality of remote participants hold a conference using a device such as a PC has become widespread. By starting a web browser or a dedicated application installed in the PC and accessing an access destination designated by the URL allocated for each conference, a user who knows the URL can participate in the conference as a participant.

The participant's voice collected by the microphone is transmitted to a device used by another participant via the server to output from a headphone or a speaker. Furthermore, a video showing the participant imaged by the camera is transmitted to a device used by another participant via the server and displayed on a display of the device.

As a result, each participant can have a conversation while looking at the faces of another participant.

CITATION LIST

Patent Literature

Patent Literature 1: JP 11-331992 A

SUMMARY

Technical Problem

It is difficult to hear the voices when a plurality of participants speak at the same time.

In addition, since the voice of the participant is only output in a planar manner, it is not possible to feel a sound image or the like, and it is difficult to obtain the sense that the participant exists from the voice.

The present technology has been made in view of such a situation, and an object of the present technology is to make an utterance voice easy to hear according to an utterance situation.

Solution to Problem

An information processing device according to one aspect of the present technology includes: a storage unit that stores HRTF data corresponding to a plurality of positions based on a listening position; and a sound image localization processing unit that performs a sound image localization process on sound data of an utterer by using the HRTF data according to an utterance situation of a participant participating in a conversation via a network.

An information processing terminal according to another aspect of the present technology includes: a sound reception unit that stores HRTF data corresponding to a plurality of positions based on a listening position, receives sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputs a voice of the utterer.

In one aspect of this technology, HRTF data corresponding to a plurality of positions based on a listening position are stored; and a sound image localization process is performed on sound data of an utterer by using the HRTF data according to an utterance situation of a participant participating in a conversation via a network.

In another aspect of this technology, HRTF data corresponding to a plurality of positions based on a listening position are stored, sound data is received, of an utterer, obtained by performing a sound image localization process, the sound data being transmitted from an information processing device that performs the sound image localization process on sound data of the utterer by using the HRTF data according to an utterance situation of a participant participating in a conversation via a network, and a voice of the utterer is output.

BRIEF DESCRIPTION OF DRAWINGS

FIG. 12 is a diagram illustrating an example of participant information.

FIG. 21 is a diagram illustrating a flow of processing regarding management of sound effect setting.

DESCRIPTION OF EMBODIMENTS

Hereinafter, modes for carrying out the present technology will be described. The description will be given in the following order.
1. Configuration of Tele-communication System
2. Basic Operation
3. Configuration of each device
4. Use case of sound image localization
5. Modification Configuration of Tele-Communication System FIG. 1 is a diagram illustrating a configuration example of a Tele-communication system according to an embodiment of the present technology.

Figure 1:
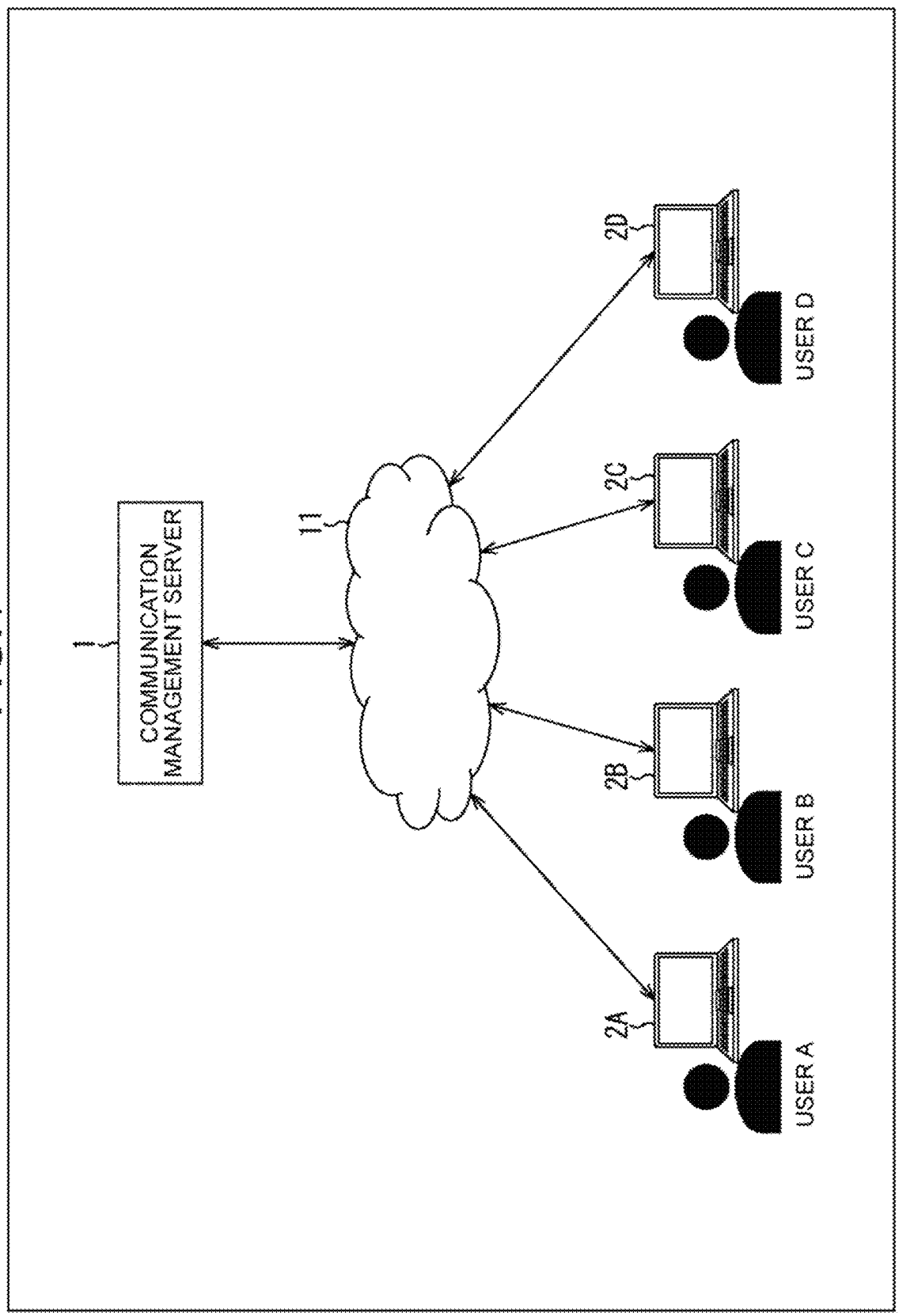
FIG. 1 is a diagram illustrating a configuration example of a Tele-communication system according to an embodiment of the present technology.

The Tele-communication system in FIG. 1 is configured by connecting a plurality of client terminals used by conference participants to the communication management server 1 via a network 11 such as the Internet. In the example of FIG. 1, client terminals 2A to 2D which are PCs are illustrated as client terminals used by users A to D who are participants of the conference.

Another device such as a smartphone or a tablet terminal including a sound input device such as a microphone and a sound output device such as a headphone or a speaker may be used as the client terminal. In a case where it is not necessary to distinguish between the client terminals 2A to 2D, the client terminal is appropriately referred to as a client terminal 2.

The users A to D are users who participate in the same conference. Note that the number of users participating in the conference is not limited to four.

The communication management server 1 manages a conference held by a plurality of users who have a conversation online. The communication management server 1 is an information processing device that controls transmission and reception of voices between the client terminals 2 and manages a so-called remote conference.

Figure 2:
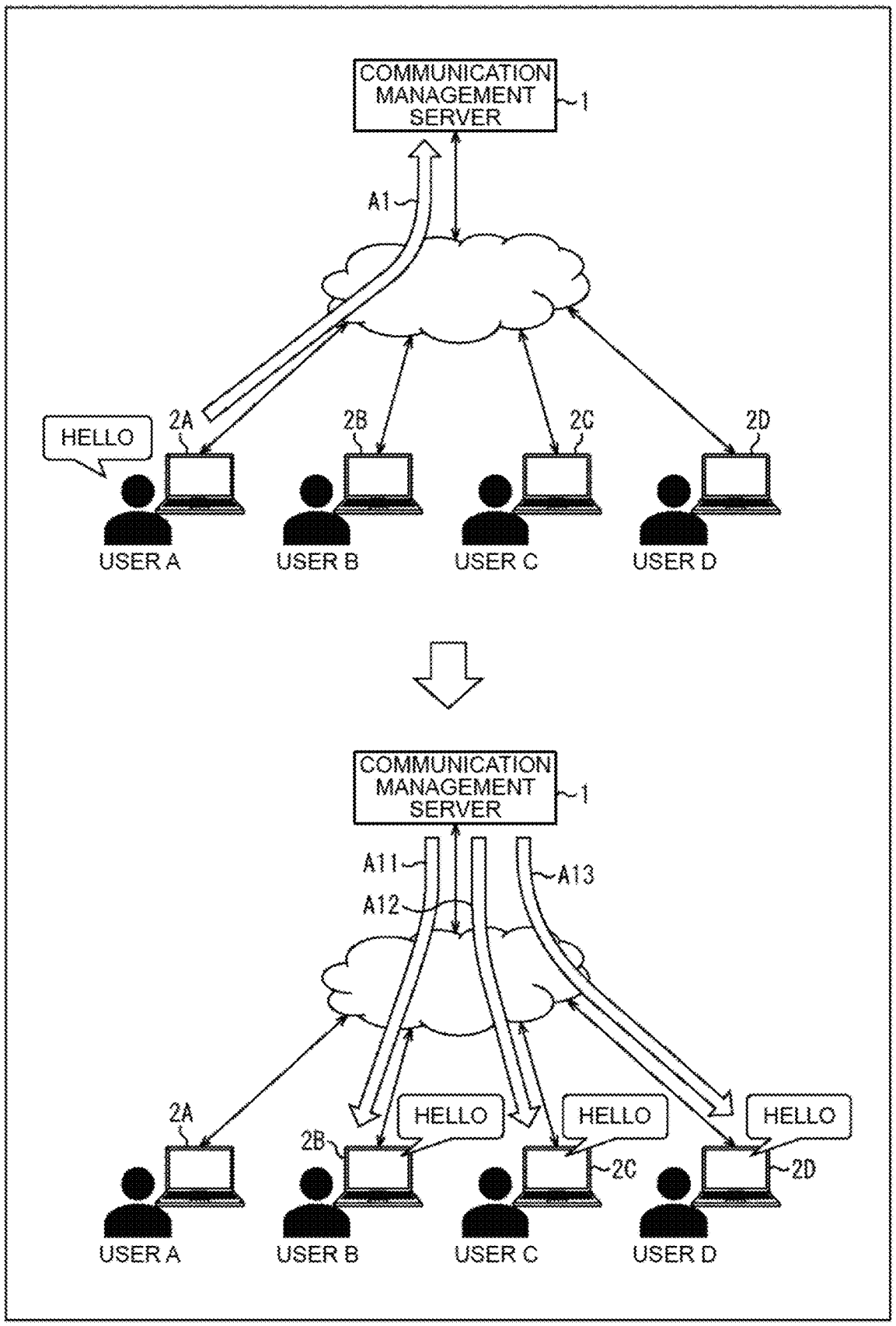
FIG. 2 is a diagram illustrating an example of transmission and reception of sound data.

For example, as indicated by an arrow A1 in the upper part of FIG. 2, the communication management server 1 receives the sound data of the user A transmitted from the client terminal 2A in response to the utterance of the user A. The sound data of the user A collected by the microphone provided in the client terminal 2A is transmitted from the client terminal 2A.

The communication management server 1 transmits the sound data of the user A to each of the client terminals 2B to 2D as indicated by arrows A11 to A13 in the lower part of FIG. 2 to output the voice of the user A. In a case where the user A utters as an utterer, the users B to D become listeners. Hereinafter, a user who is an utterer is referred to as an uttering user, and a user who is a listener is referred to as a listening user as appropriate.

Similarly, in a case where another user has made an utterance, the sound data transmitted from the client terminal 2 used by the uttering user is transmitted to the client terminal 2 used by the listening user via the communication management server 1.

The communication management server 1 manages the position of each user in the virtual space. The virtual space is, for example, a three-dimensional space virtually set as a place where a conference is held. The position in the virtual space is represented by three-dimensional coordinates.

Figure 3:
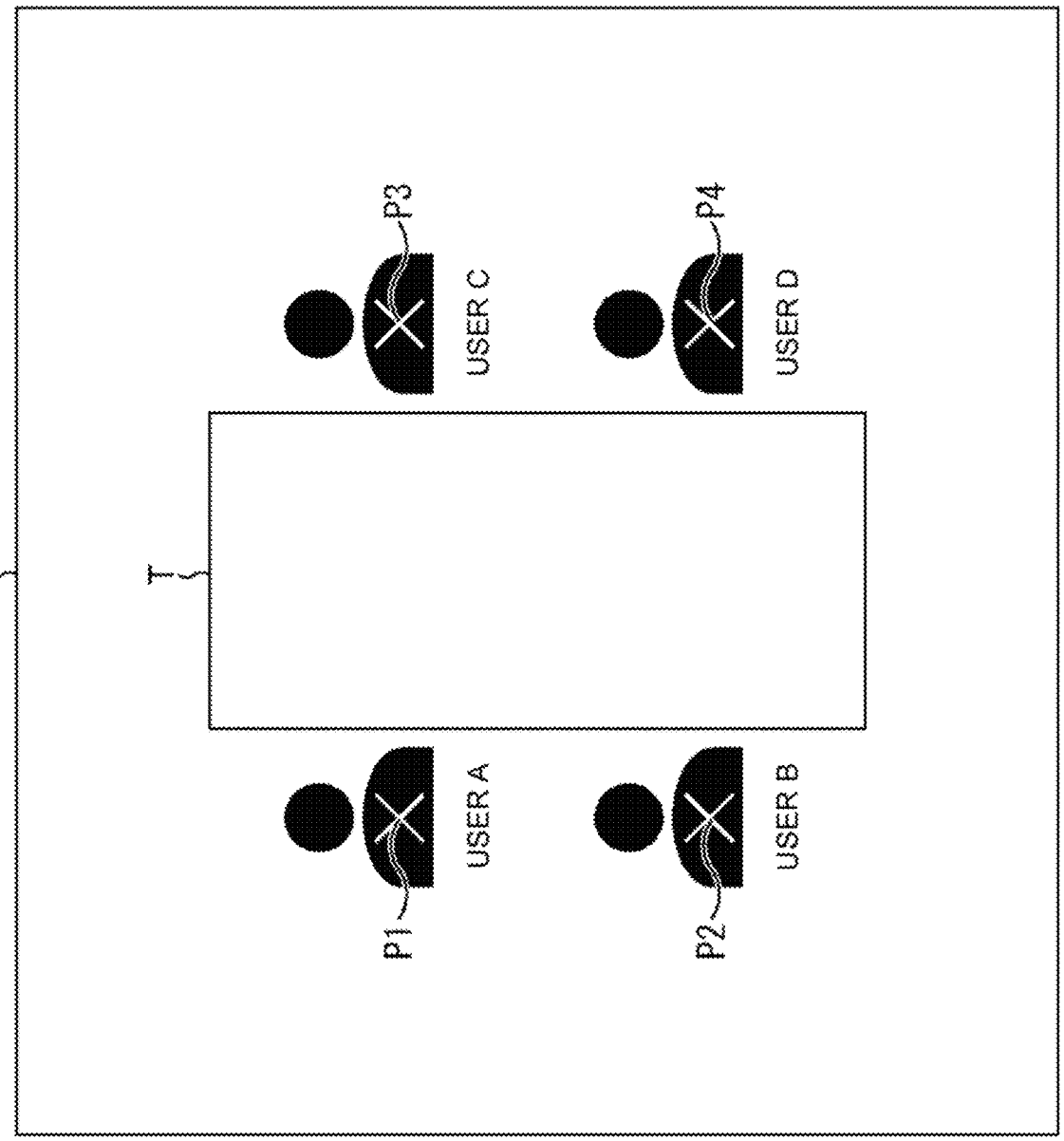
FIG. 3 is a plan view illustrating an example of a position of a user in a virtual space.

FIG. 3 is a plan view illustrating an example of the position of the user in the virtual space.

In the example of FIG. 3, a vertically long rectangular table T is disposed substantially at the center of a virtual space indicated by a rectangular frame F, and positions P1 to P4, which are positions around the table T, are set as positions of users A to D. The front direction of each user is the direction toward the table T from the position of each user.

Figure 4:
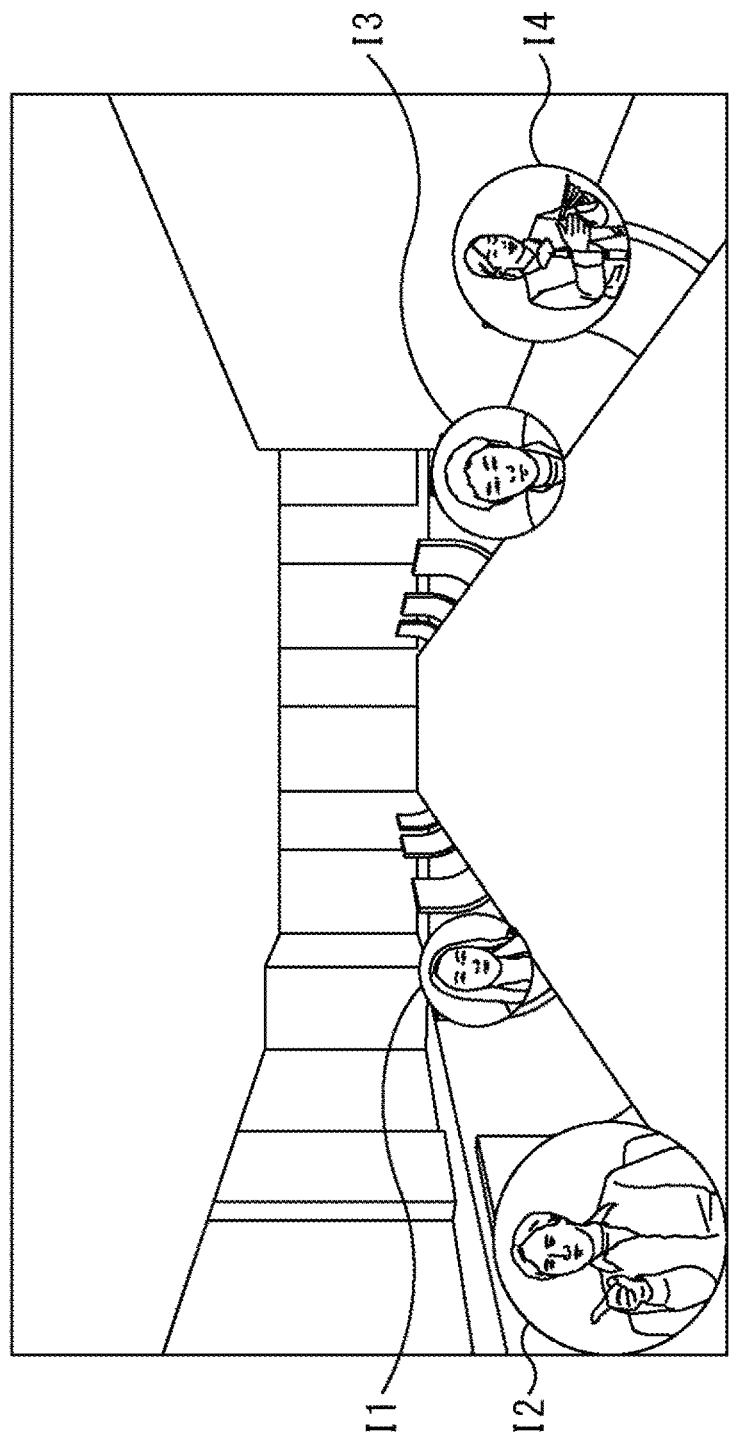
FIG. 4 is a diagram illustrating a display example of a remote conference screen.

During the conference, on the screen of the client terminal 2 used by each user, as illustrated in FIG. 4, a participant icon that is information visually representing the user is displayed in superposition with a background image representing a place where the conference is held. The position of the participant icon on the screen is a position corresponding to the position of each user in the virtual space.

In the example of FIG. 4, the participant icon is configured as a circular image including the user's face. The participant icon is displayed in a size corresponding to the distance from the reference position set in the virtual space to the position of each user. The participant icons I1 to I4 represent users A to D, respectively.

For example, the position of each user is automatically set by the communication management server 1 when the user participates in the conference. The position in the virtual space may be set by the user himself/herself by moving the participant icon on the screen of FIG. 4 or the like.

The communication management server 1 has HRTF data that is data of a head-related transfer function (HRTF) representing sound transfer characteristics from a plurality of positions to a listening position when each position in the virtual space is set as the listening position. The HRTF data corresponding to a plurality of positions based on each listening position in the virtual space is prepared in the communication management server 1.

The communication management server 1 performs a sound image localization process using the HRTF data on the sound data so that the voice of the uttering user can be heard from the position of the uttering user in the virtual space for each listening user to transmit the sound data obtained by performing the sound image localization process.

The sound data transmitted to the client terminal 2 as described above is sound data obtained by performing the sound image localization process in the communication management server 1. The sound image localization process includes rendering such as vector based amplitude panning (VBAP) based on positional information, and binaural processing using HRTF data.

That is, the voice of each uttering user is processed in the communication management server 1 as the sound data of the object audio. For example, L/R two-channel channel-based audio data generated by the sound image localization process in the communication management server 1 is transmitted from the communication management server 1 to each client terminal 2, and the voice of the uttering user is output from headphones or the like provided in the client terminal 2.

By performing the sound image localization process using the HRTF data according to the relative positional relationship between the position of the listening user and the position of the uttering user, each of the listening users feels that the voice of the uttering user is heard from the position of the uttering user.

Figure 5:
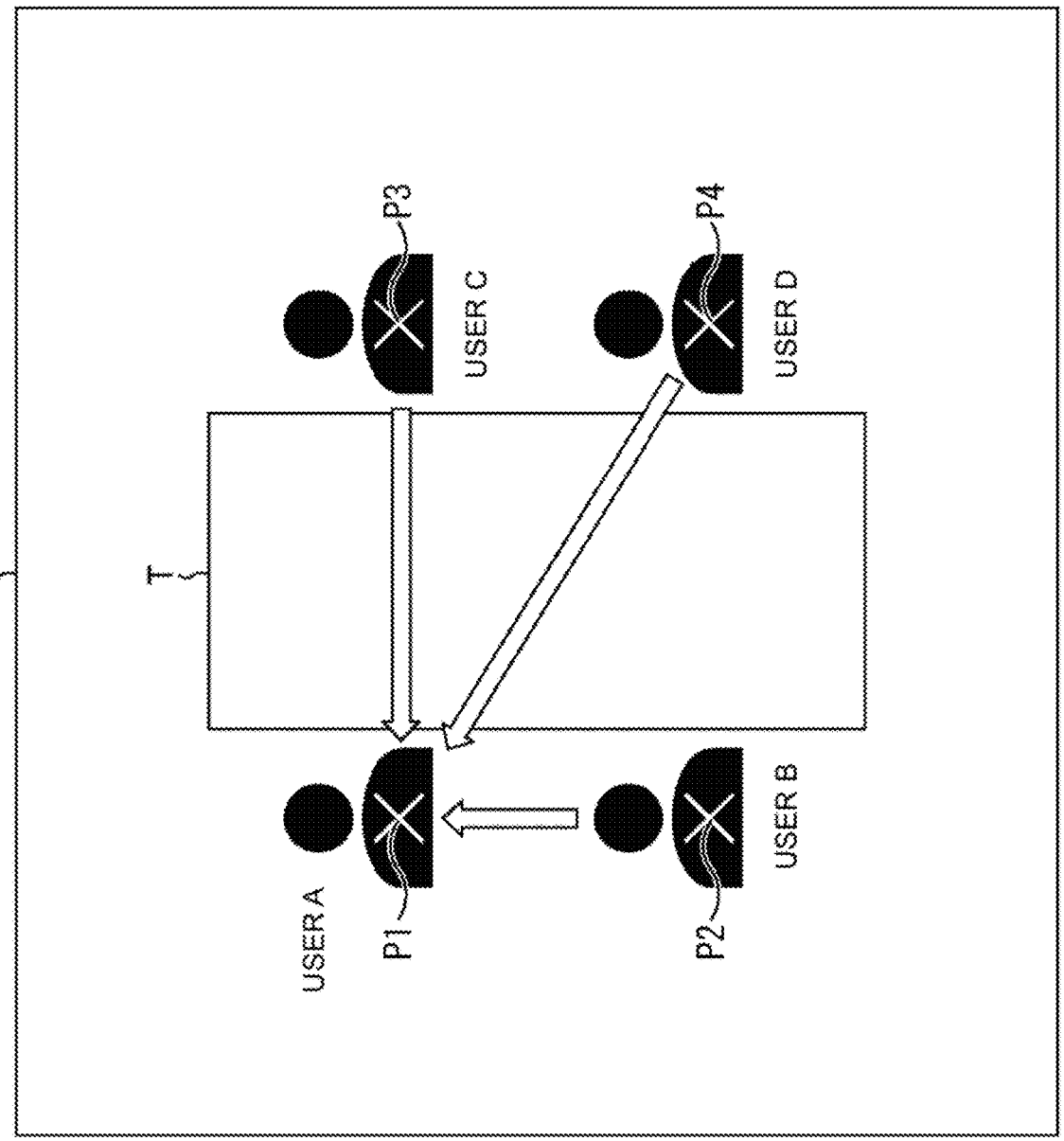
FIG. 5 is a diagram illustrating an example of how a voice is heard.

FIG. 5 is a diagram illustrating an example of how a voice is heard.

When the user A whose position P1 is set as the position in the virtual space is focused on as the listening user, the voice of the user B is heard from the near right by performing the sound image localization process based on the HRTF data between the position P2 and the position P1 with the position P2 as the sound source position as indicated by the arrow in FIG. 5. The front of the user A having a conversation with the face facing the client terminal 2A is the direction toward the client terminal 2A.

Furthermore, the voice of the user C is heard from the front by performing the sound image localization process based on the HRTF data between the position P3 and the position P1 with the position P3 as the sound source position. The voice of the user D is heard from the far right by performing the sound image localization process based on the HRTF data between the position P4 and the position P1 with the position P4 as the sound source position.

Figure 6:
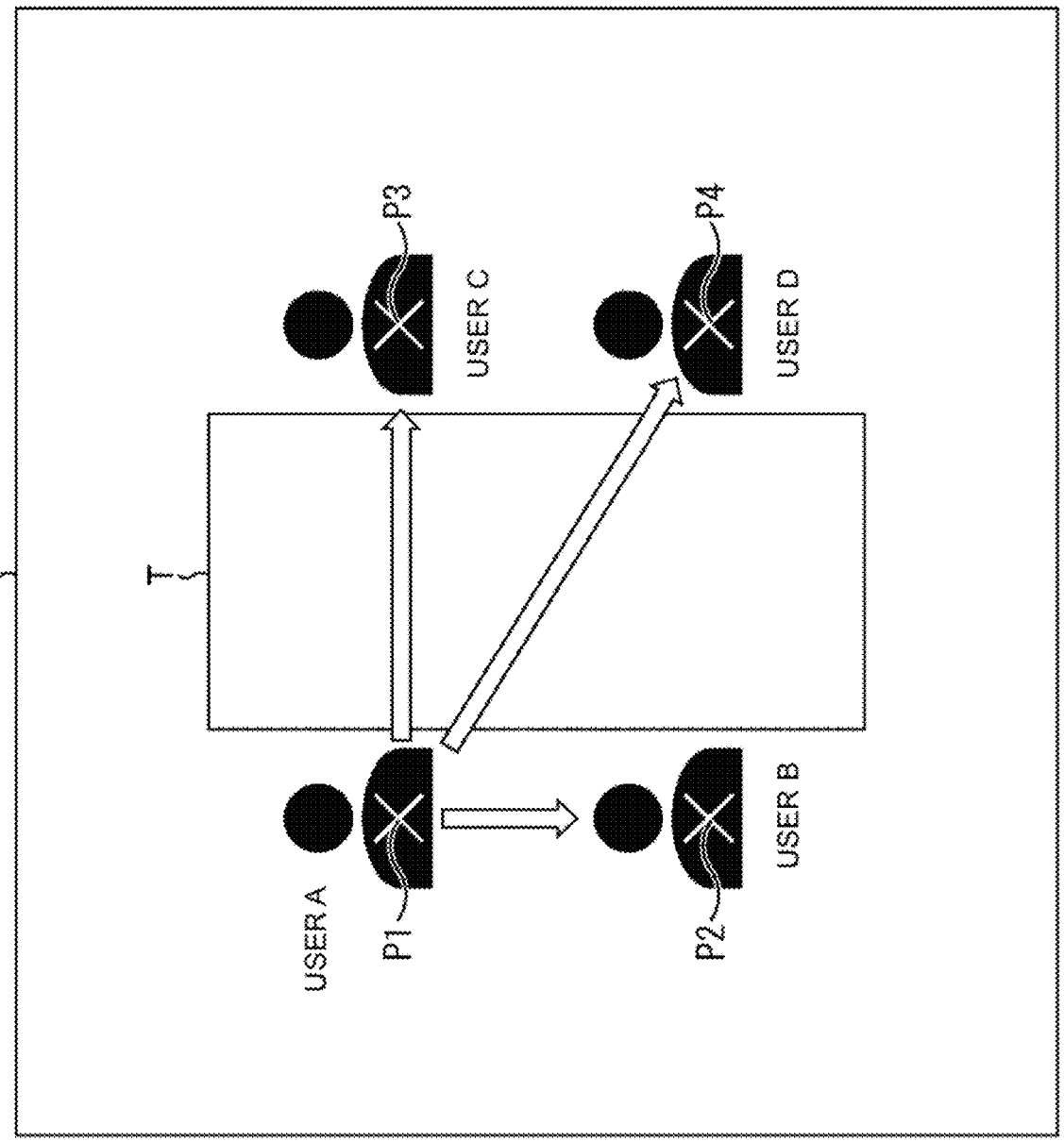
FIG. 6 is a diagram illustrating another example of how a voice is heard.

The same applies to a case where another user is a listening user. For example, as illustrated in FIG. 6, the voice of the user A is heard from the near left for the user B who is having a conversation with the face facing the client terminal 2B, and is heard from the front for the user C who is having a conversation with the face facing the client terminal 2C. Furthermore, the voice of the user A is heard from the far right for the user D who is having a conversation with the face facing the client terminal 2D.

As described above, in the communication management server 1, the sound data for each listening user is generated according to the positional relationship between the position of each listening user and the position of the uttering user, and is used for outputting the voice of the uttering user. The sound data transmitted to each of the listening users is sound data that is different in how the uttering user is heard according to the positional relationship between the position of each of the listening users and the position of the uttering user.

Figure 7:
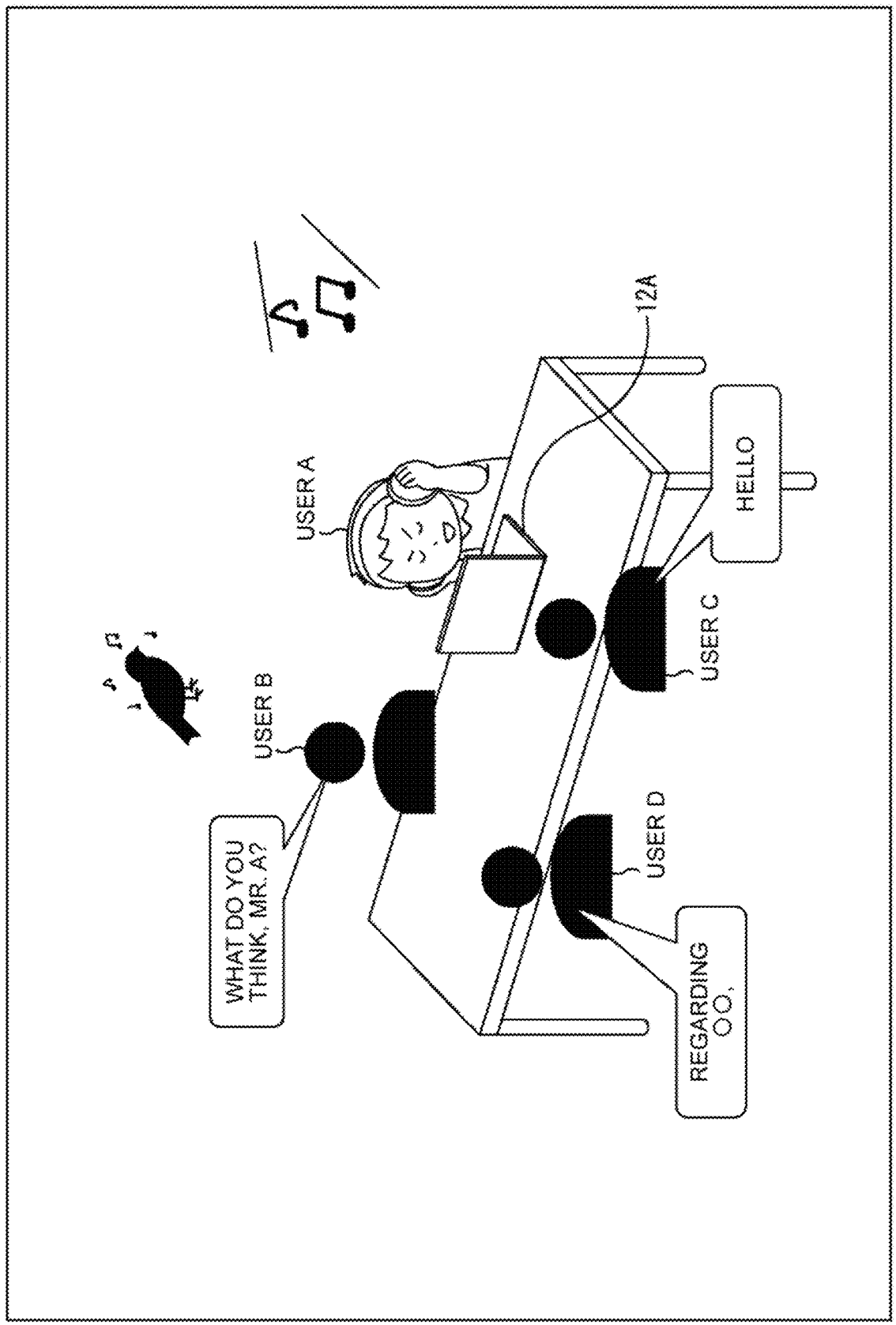
FIG. 7 is a diagram illustrating a state of a user participating in a conference.

FIG. 7 is a diagram illustrating a state of a user participating in a conference.

For example, the user A wearing the headphone and participating in the conference listens to the voices of the users B to D whose sound images are localized at the near right position, the front position, and the far right position, respectively, and has a conversation. As described with reference to FIG. 5 and the like, based on the position of the user A, the positions of the users B to D are the near right position, the front position, and the far right position, respectively. Note that, in FIG. 7, the fact that the users B to D are colored indicates that the users B to D do not exist in the space same as the space in which the user A is performing the conference.

Note that, as will be described later, background sounds such as bird chirping and BGM are also output based on sound data obtained by the sound image localization process so that the sound image is localized at a predetermined position.

The sound to be processed by the communication management server 1 includes not only the utterance voice but also sounds such as an environmental sound and a background sound. Hereinafter, in a case where it is not necessary to distinguish the types of respective sounds, a sound to be processed by the communication management server 1 will be simply described as a sound. Actually, the sound to be processed by the communication management server 1 includes sound of a type other than a voice.

Since the voice of the uttering user is heard from the position corresponding to the position in the virtual space, the listening user can easily distinguish between the voices of the respective users even in a case where there is a plurality of participants. For example, even in a case where a plurality of users makes utterances at the same time, the listening user can distinguish between the respective voices.

Furthermore, since the voice of the uttering user can be felt stereoscopically, the listening user can obtain the feeling that the uttering user exists at the position of the sound image from the voice. The listening user can have a realistic conversation with another user.

Basic Operation

Here, a flow of basic operations of the communication management server 1 and the client terminal 2 will be described.

Operation of Communication Management Server 1

Figure 8:
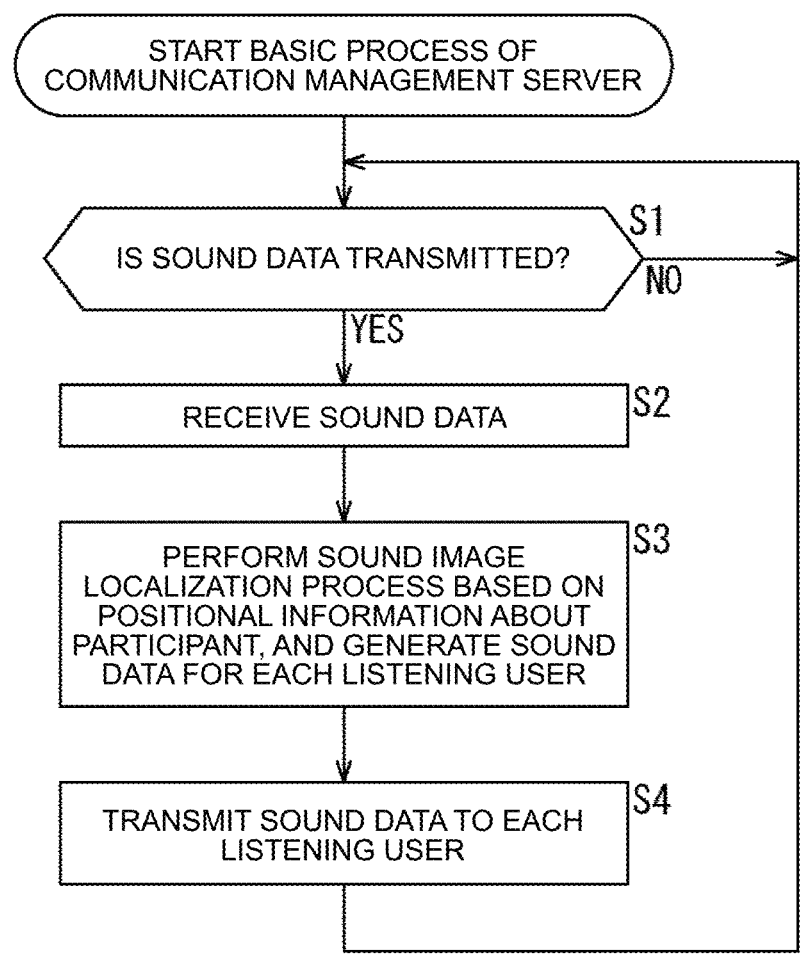
FIG. 8 is a flowchart illustrating a basic process of a communication management server.

The basic process of the communication management server 1 will be described with reference to a flowchart of FIG. 8.

In Step S1, the communication management server 1 determines whether the sound data has been transmitted from the client terminal 2, and waits until it is determined that the sound data has been transmitted.

In a case where it is determined in Step S1 that the sound data has been transmitted from the client terminal 2, in Step S2, the communication management server 1 receives the sound data transmitted from the client terminal 2.

In Step S3, the communication management server 1 performs a sound image localization process based on the positional information about each user and generates sound data for each listening user.

For example, the sound data for the user A is generated such that the sound image of the voice of the uttering user is localized at a position corresponding to the position of the uttering user when the position of the user A is used as a reference.

Furthermore, the sound data for the user B is generated such that the sound image of the voice of the uttering user is localized at a position corresponding to the position of the uttering user when the position of the user B is used as a reference.

Similarly, the sound data for another listening user is generated using the HRTF data according to the relative positional relationship with the uttering user with the position of the listening user as a reference. The sound data for respective listening users is different data.

In Step S4, the communication management server 1 transmits sound data to each listening user. The above processing is performed every time sound data is transmitted from the client terminal 2 used by the uttering user.

Operation of Client Terminal 2

Figure 9:
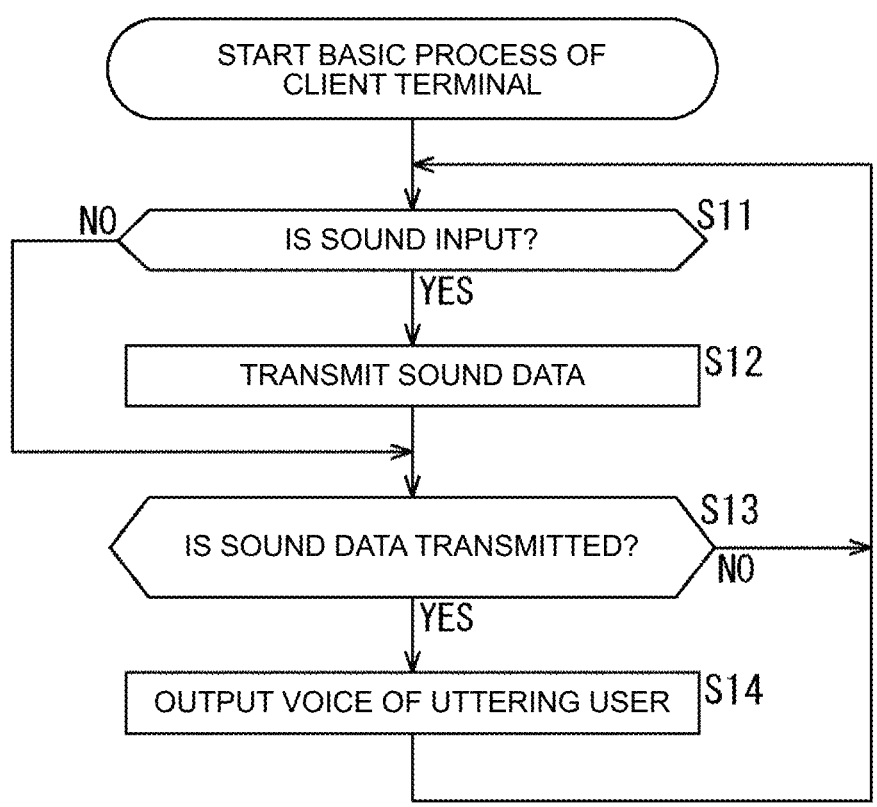
FIG. 9 is a flowchart illustrating a basic process of a client terminal.

The basic process of the client terminal 2 will be described with reference to the flowchart of FIG. 9.

In Step S11, the client terminal 2 determines whether a microphone sound has been input. The microphone sound is a sound collected by a microphone provided in the client terminal 2.

In a case where it is determined in Step S11 that the microphone sound has been input, the client terminal 2 transmits the sound data to the communication management server 1 in Step S12. In a case where it is determined in Step S11 that the microphone sound has not been input, the process of Step S12 is skipped.

In Step S13, the client terminal 2 determines whether sound data has been transmitted from the communication management server 1.

In a case where it is determined in Step S13 that the sound data has been transmitted, the communication management server 1 receives the sound data to output the voice of the uttering user in Step S14.

After the voice of the uttering user has been output, or in a case where it is determined in Step S13 that the sound data has not been transmitted, the process returns to Step S11, and the above-described processing is repeatedly performed.

Configuration of Each Device

Configuration of Communication Management Server 1

Figure 10:
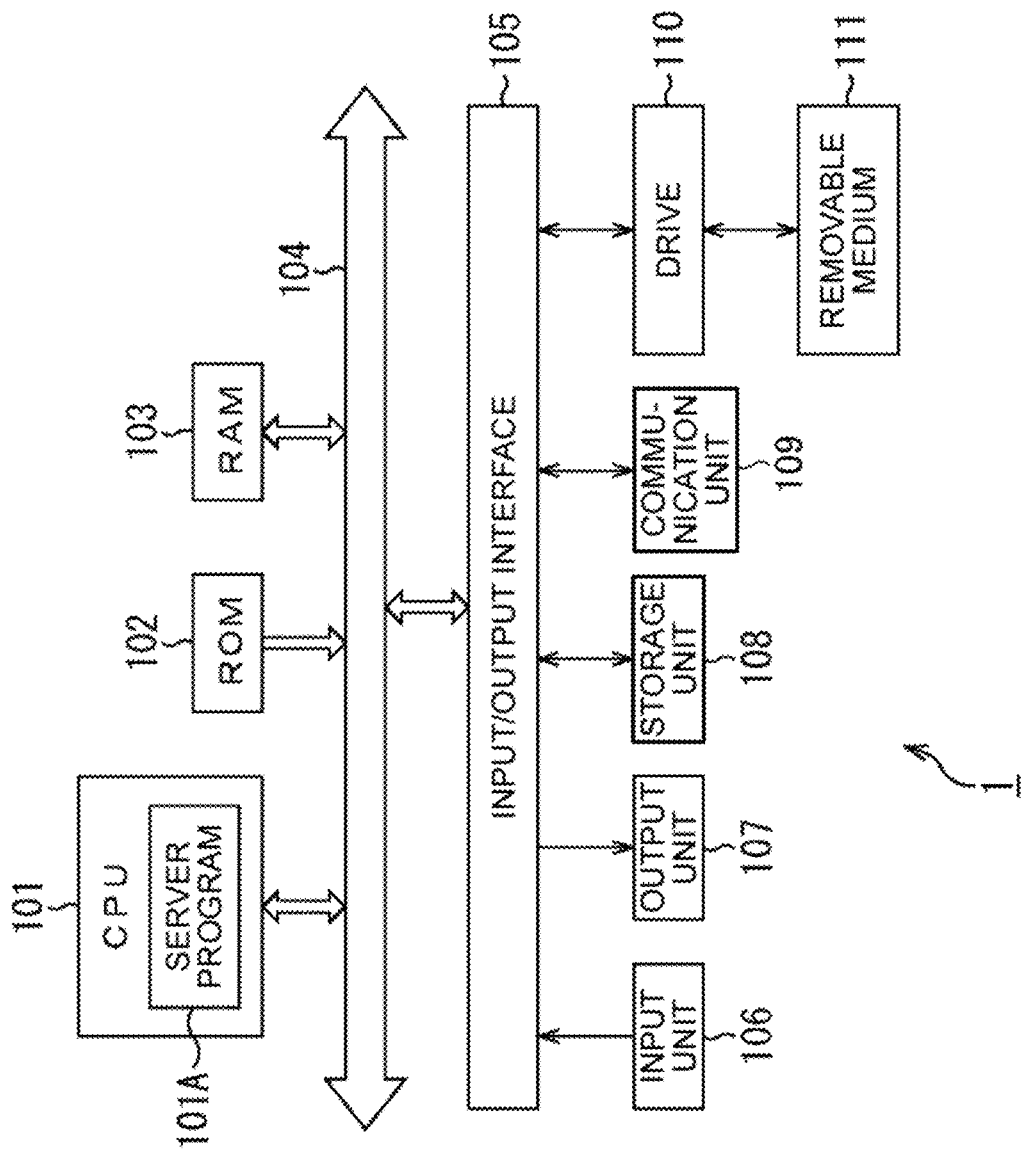
FIG. 10 is a block diagram illustrating a hardware configuration example of a communication management server.

FIG. 10 is a block diagram illustrating a hardware configuration example of a communication management server 1.

The communication management server 1 includes a computer. The communication management server 1 may include one computer having the configuration illustrated in FIG. 10 or may include a plurality of computers.

A CPU 101, a ROM 102, and a RAM 103 are connected to one another by a bus 104. The CPU 101 executes a server program 101A and controls the overall operation of the communication management server 1. The server program 101A is a program for realizing a Tele-communication system.

An input/output interface 105 is further connected to the bus 104. An input unit 106 including a keyboard, a mouse, and the like, and an output unit 107 including a display, a speaker, and the like are connected to the input/output interface 105.

Furthermore, a storage unit 108 including a hard disk, a nonvolatile memory, or the like, a communication unit 109 including a network interface or the like, and a drive 110 that drives a removable medium 111 are connected to the input/output interface 105. For example, the communication unit 109 communicates with the client terminal 2 used by each user via the network 11.

Figure 11:
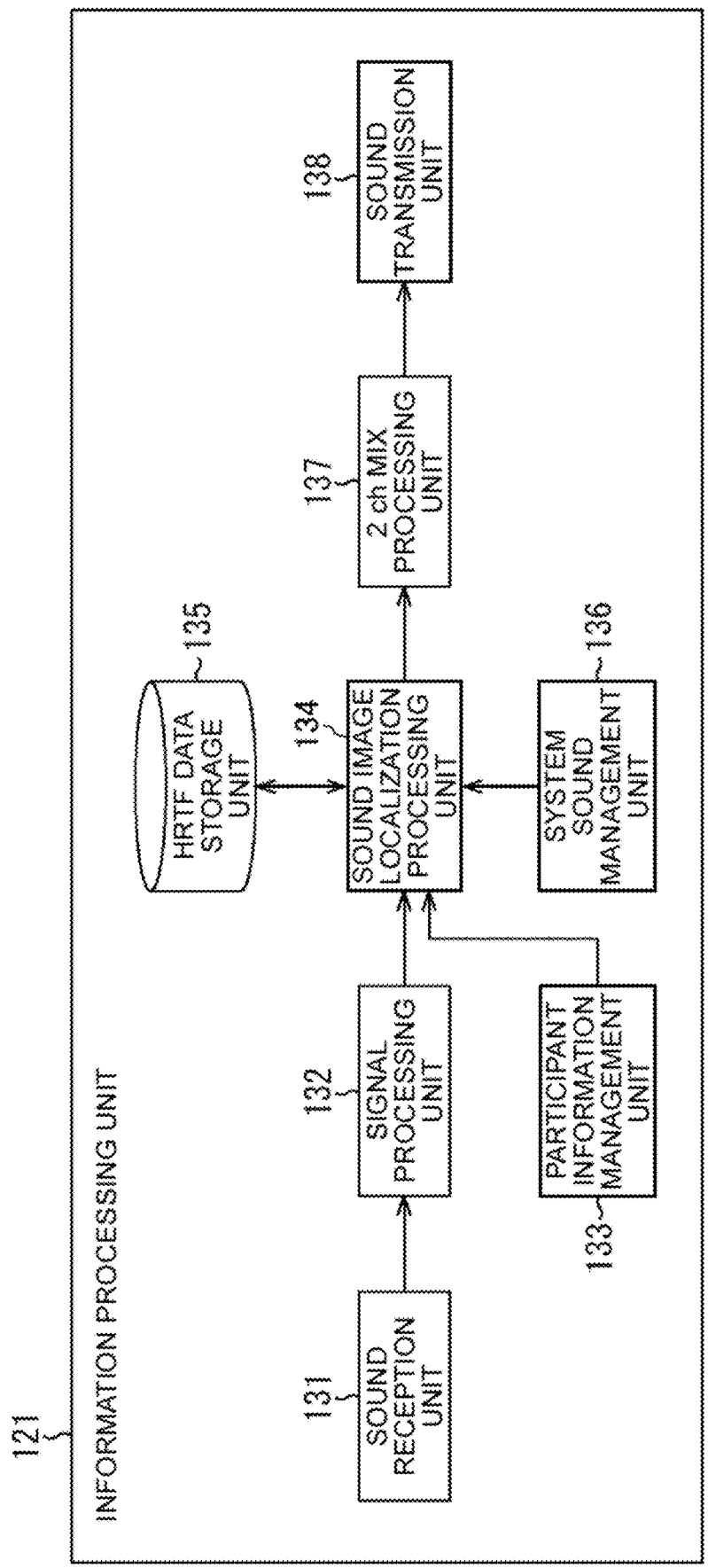
FIG. 11 is a block diagram illustrating a functional configuration example of a communication management server.

FIG. 11 is a block diagram illustrating a functional configuration example of the communication management server 1. At least some of the functional units illustrated in FIG. 11 is realized by the CPU 101 in FIG. 10 executing the server program 101A.

In the communication management server 1, an information processing unit 121 is implemented. The information processing unit 121 includes a sound reception unit 131, a signal processing unit 132, a participant information management unit 133, a sound image localization processing unit 134, an HRTF data storage unit 135, a system sound management unit 136, a 2 ch mix processing unit 137, and a sound transmission unit 138.

The sound reception unit 131 causes the communication unit 109 to receive the sound data transmitted from the client terminal 2 used by the uttering user. The sound data received by the sound reception unit 131 is output to the signal processing unit 132.

The signal processing unit 132 appropriately performs predetermined signal process on sound data supplied from the sound reception unit 131 to output sound data obtained by performing the signal process to the sound image localization processing unit 134. For example, the process of separating the voice of the uttering user and the environmental sound is performed by the signal processing unit 132. The microphone sound includes, in addition to the voice of the uttering user, an environmental sound such as noise in a space where the uttering user is located.

The participant information management unit 133 causes the communication unit 109 to communicate with the client terminal 2 or the like, thereby managing the participant information that is information about the participant of the conference.

FIG. 12 is a diagram illustrating an example of participant information.

As illustrated in FIG. 12, the participant information includes user information, positional information, setting information, and volume information.

The user information is information about a user who participates in a conference set by a certain user. For example, the user information includes a user ID and the like. Other information included in the participant information is managed in association with, for example, the user information.

The positional information is information representing the position of each user in the virtual space.

The setting information is information representing contents of setting related to the conference, such as setting of a background sound to be used in the conference.

The volume information is information representing a sound volume at the time of outputting a voice of each user.

The participant information managed by the participant information management unit 133 is supplied to the sound image localization processing unit 134. The participant information managed by the participant information management unit 133 is also supplied to the system sound management unit 136, the 2 ch mix processing unit 137, the sound transmission unit 138, and the like as appropriate. As described above, the participant information management unit 133 functions as a position management unit that manages the position of each user in the virtual space, and also functions as a background sound management unit that manages the setting of the background sound.

The sound image localization processing unit 134 reads and acquires the HRTF data according to the positional relationship of each user from the HRTF data storage unit 135 based on the positional information supplied from the participant information management unit 133. The sound image localization processing unit 134 performs a sound image localization process using the HRTF data read from the HRTF data storage unit 135 on the sound data supplied from the signal processing unit 132 to generate sound data for each listening user.

Furthermore, the sound image localization processing unit 134 performs a sound image localization process using predetermined HRTF data on the data of the system sound supplied from the system sound management unit 136. The system sound is a sound generated by the communication management server 1 and heard by the listening user together with the voice of the uttering user. The system sound includes, for example, a background sound such as BGM and a sound effect. The system sound is a sound different from the user's voice.

That is, in the communication management server 1, a sound other than the voice of the uttering user, such as a background sound or a sound effect, is also processed as the object audio. A sound image localization process for localizing a sound image at a predetermined position in the virtual space is also performed on the sound data of the system sound. For example, the sound image localization process for localizing a sound image at a position farther than the position of the participant is performed on the sound data of the background sound.

The sound image localization processing unit 134 outputs sound data obtained by performing the sound image localization process to the 2 ch mix processing unit 137. The sound data of the uttering user and the sound data of the system sound as appropriate are output to the 2 ch mix processing unit 137.

The HRTF data storage unit 135 stores HRTF data corresponding to a plurality of positions based on respective listening positions in the virtual space.

The system sound management unit 136 manages a system sound. The system sound management unit 136 outputs the sound data of the system sound to the sound image localization processing unit 134.

The 2 ch mix processing unit 137 performs a 2 ch mix process on the sound data supplied from the sound image localization processing unit 134. By performing the 2 ch mix process, channel-based audio data including the components of an audio signal L and an audio signal R of the uttering user's voice and the system sound, respectively, is generated. The sound data obtained by performing the 2 ch mix process is output to the sound transmission unit 138.

The sound transmission unit 138 causes the communication unit 109 to transmit the sound data supplied from the 2 ch mix processing unit 137 to the client terminal 2 used by each listening user.

Configuration of Client Terminal 2

Figure 13:
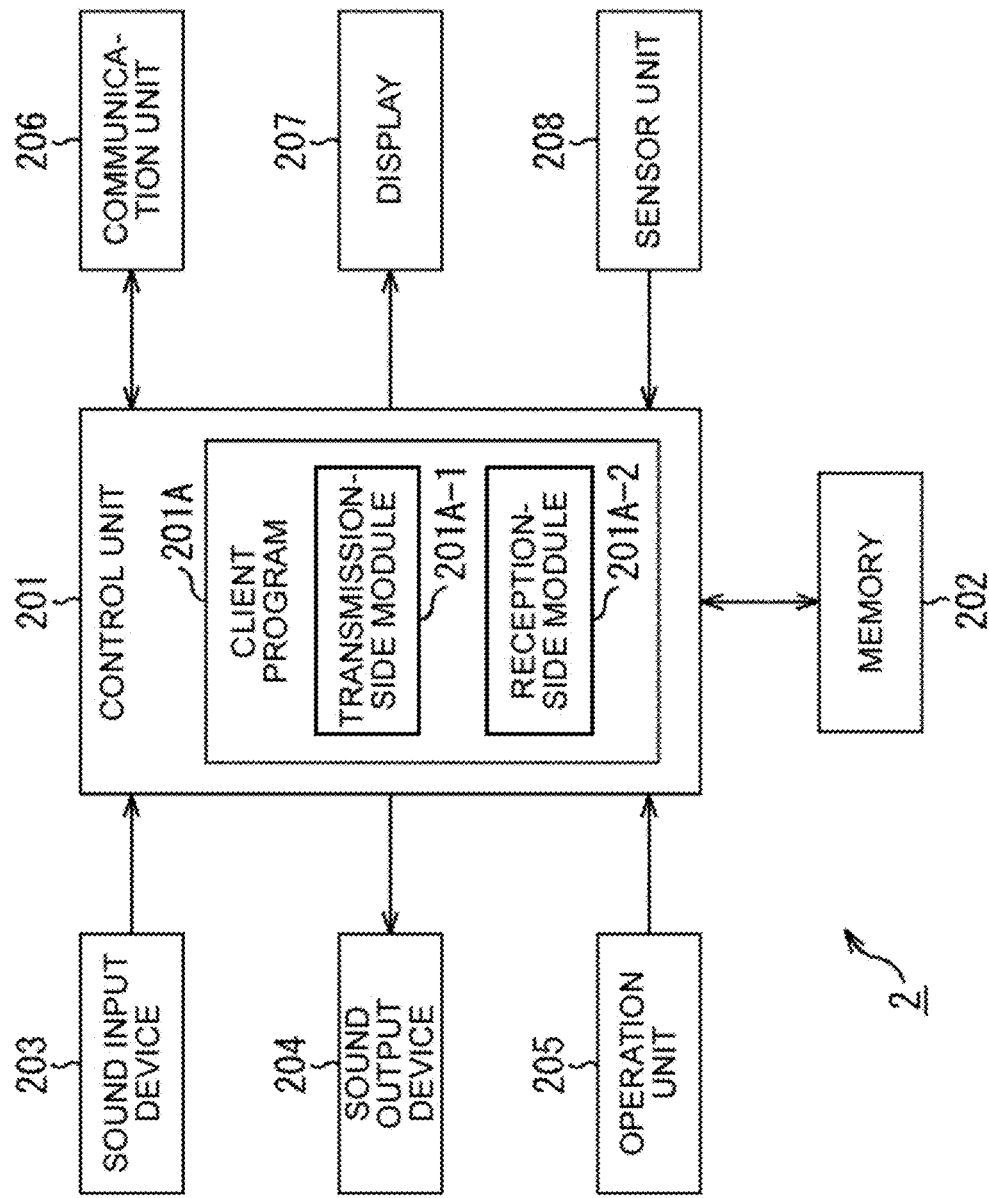
FIG. 13 is a block diagram illustrating a hardware configuration example of a client terminal.

FIG. 13 is a block diagram illustrating a hardware configuration example of the client terminal 2.

The client terminal 2 is configured by connecting a memory 202, a sound input device 203, a sound output device 204, an operation unit 205, a communication unit 206, a display 207, and a sensor unit 208 to a control unit 201.

The control unit 201 includes a CPU, a ROM, a RAM, and the like. The control unit 201 controls the entire operation of the client terminal 2 by executing a client program 201A. The client program 201A is a program for using the Telecommunication system managed by the communication management server 1. The client program 201A includes a transmission-side module 201A-1 that executes a transmission-side process and a reception-side module 201A-2 that executes a reception-side process.

The memory 202 includes a flash memory or the like. The memory 202 stores various types of information such as the client program 201A executed by the control unit 201.

The sound input device 203 includes a microphone. The sound collected by the sound input device 203 is output to the control unit 201 as a microphone sound.

The sound output device 204 includes a device such as a headphone or a speaker. The sound output device 204 outputs the voice or the like of the conference participant based on the audio signal supplied from the control unit 201.

Hereinafter, a description will be given on the assumption that the sound input device 203 is a microphone as appropriate. Furthermore, a description will be given on the assumption that the sound output device 204 is a headphone.

The operation unit 205 includes various buttons and a touch panel provided to overlap the display 207. The operation unit 205 outputs information representing the content of the user's operation to the control unit 201.

The communication unit 206 is a communication module complying with wireless communication of a mobile communication system such as 5G communication, a communication module complying with a wireless LAN, or the like. The communication unit 206 receives radio waves output from the base station and communicates with various devices such as the communication management server 1 via the network 11. The communication unit 206 receives information transmitted from the communication management server 1 to output the information to the control unit 201. Furthermore, the communication unit 206 transmits the information supplied from the control unit 201 to the communication management server 1.

The display 207 includes an organic EL display, an LCD, or the like. Various screens such as a remote conference screen are displayed on the display 207.

The sensor unit 208 includes various sensors such as an RGB camera, a depth camera, a gyro sensor, and an acceleration sensor. The sensor unit 208 outputs sensor data obtained by performing measurement to the control unit 201. The user's situation is appropriately recognized based on the sensor data measured by the sensor unit 208.

Figure 14:
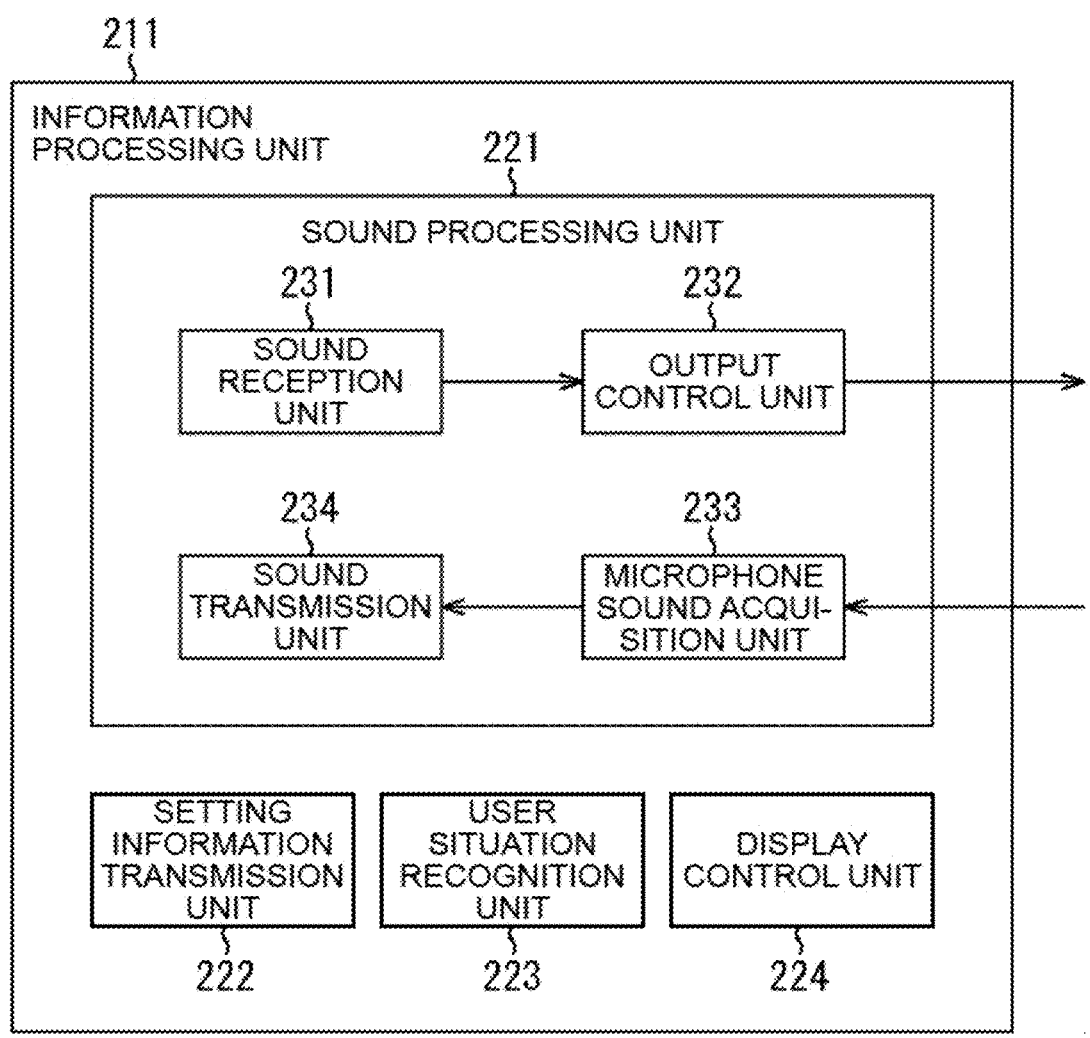
FIG. 14 is a block diagram illustrating a functional configuration example of a client terminal.

FIG. 14 is a block diagram illustrating a functional configuration example of the client terminal 2. At least some of the functional units illustrated in FIG. 14 is realized by the control unit 201 in FIG. 13 executing the client program 201A.

In the client terminal 2, an information processing unit 211 is realized. The information processing unit 211 includes a sound processing unit 221, a setting information transmission unit 222, a user situation recognition unit 223, and a display control unit 224.

The information processing unit 211 includes a sound reception unit 231, an output control unit 232, a microphone sound acquisition unit 233, and a sound transmission unit 234.

The sound reception unit 231 causes the communication unit 206 to receive the sound data transmitted from the communication management server 1. The sound data received by the sound reception unit 231 is supplied to the output control unit 232.

The output control unit 232 causes the sound output device 204 to output a sound corresponding to the sound data transmitted from the communication management server 1.

The microphone sound acquisition unit 233 acquires sound data of the microphone sound collected by the microphone constituting the sound input device 203. The sound data of the microphone sound acquired by the microphone sound acquisition unit 233 is supplied to the sound transmission unit 234.

The sound transmission unit 234 causes the communication unit 206 to transmit the sound data of the microphone sound supplied from the microphone sound acquisition unit 233 to the communication management server 1.

The setting information transmission unit 222 generates setting information representing contents of various settings according to a user's operation. The setting information transmission unit 222 causes the communication unit 206 to transmit the setting information to the communication management server 1.

The user situation recognition unit 223 recognizes the situation of the user based on the sensor data measured by the sensor unit 208. The user situation recognition unit 223 causes the communication unit 206 to transmit information representing the situation of the user to the communication management server 1.

The display control unit 224 causes the communication unit 206 to communicate with the communication management server 1, and causes the display 207 to display the remote conference screen based on the information transmitted from the communication management server 1.

Use Case of Sound Image Localization

A use case of sound image localization of various sounds including utterance voices by conference participants will be described.

Automatic Adjustment of Background Sound According to Input Sound

In the communication management server 1, the sound data transmitted from the client terminal 2 used by the uttering user is analyzed, and the setting of the background sound to be synthesized with the utterance voice is automatically adjusted. For example, the setting of the sound volume of the background sound, the setting of whether to synthesize the background sound (ON/OFF of the synthesis of the background sound), and the setting of the type of the background sound are adjusted.

Figure 15:
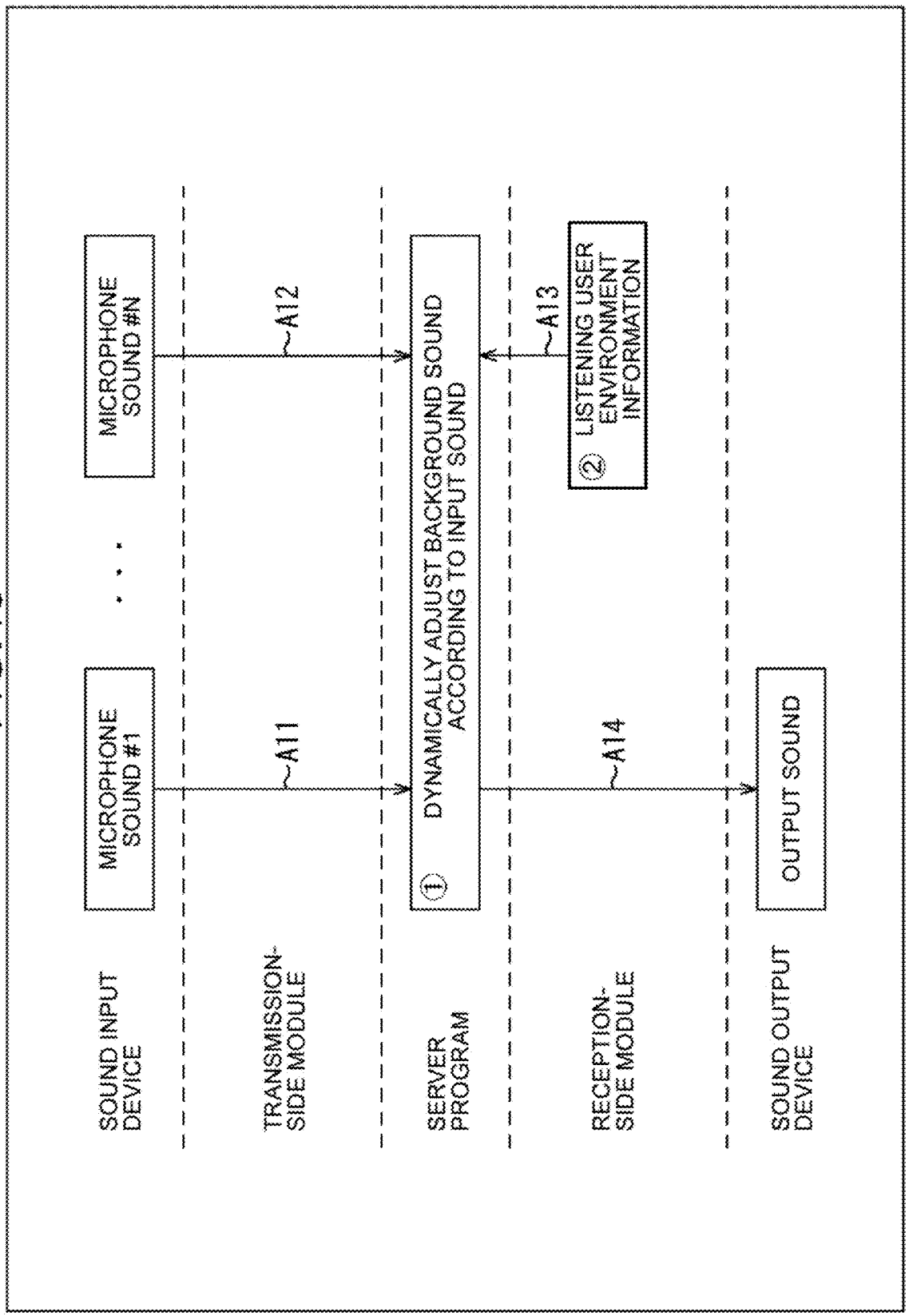
FIG. 15 is a diagram illustrating a flow of processing related to adjustment of background sound setting.

FIG. 15 is a diagram illustrating a flow of processing related to adjustment of background sound setting.

In a case where microphone sounds are transmitted from the client terminal 2 as indicated by arrows A11 and A12, each microphone sound is analyzed in the communication management server 1, and the setting of the background sound is dynamically adjusted according to the analysis result. Furthermore, the sound image localization process using the HRTF data according to the positional relationship is performed on each of the sound data of the uttering user and the sound data of the background sound whose setting has been changed.

As indicated by an arrow A13, the setting of the background sound may be adjusted in consideration of the environment for the listening user represented by the information transmitted from the client terminal 2 used by the listening user.

The sound data generated by the sound image localization process is transmitted to and output from the client terminal 2 used by each listening user as indicated by an arrow A14.

The setting of the background sound is adjusted, for example, by the system sound management unit 136 (FIG. 11) as follows.

(A) When the sound volume of all the utterance voices is smaller than the reference sound volume for a certain period of time or more, the setting is adjusted so as to increase the sound volume of the background sound. This makes it possible to alleviate the silence during a conference.

(B) When the sound volume of the environmental sound such as the noise included in the microphone sound is larger than the reference sound volume for a certain period of time or more, the setting is adjusted so as to be turned on when the synthesis of the background sound is turned off. As a result, it is possible to make noise during a conference less noticeable.

(C) The setting of the spatial sound effect is adjusted according to the number of participants. For example, the larger the number of participants, sound effect setting of the larger room is used. Spatial sound effect adjustment is realized by synthesizing sound such as reverberation representing the size of the room as a background sound.

(D) In a case where the analysis of the emotion of the uttering user and the content of the utterance is performed based on the utterance voice, the BGM matching the emotion of the uttering user and the content of the utterance is automatically selected and synthesized. For example, the degree of excitement is analyzed based on the speed feeling, sound volume, laughter, and the like of the conversation, and in a case where the conversation is not excited, the BGM with a fast tempo is selected as the background sound.

Not only the setting of the background sound but also the localization of the sound image of the background sound is appropriately adjusted based on the input sound.

For example, in the case of (A) described above, the sound image localization process is performed using the HRTF data according to the positional relationship between the position of the listening user and the localization position of the sound image so that the sound image of the background sound can be felt nearby.

Furthermore, in the case of (D) described above, when the content of the utterance of a certain uttering user is a content that please other users, the sound image localization process is performed using the HRTF data according to the positional relationship between the position of the listening user and the localization position of the sound image so that the sound image of the background sound can be felt at a distant position.

Note that the microphone sounds #1 to #N illustrated in the uppermost stage in FIG. 15 using a plurality of blocks are voices of uttering users detected in different client terminals 2. In addition, the sound output illustrated at the bottom stage using one block represents an output from the client terminal 2 used by one listening user.

As illustrated on the left side of FIG. 15, for example, the functions indicated by arrows A11 and A12 for transmitting the microphone sounds are implemented by the transmission-side module 201A-1, and the function of recognizing the environment for the listening user and transmitting the recognition result to the communication management server 1 is implemented by the reception-side module 201A-2. Furthermore, the adjustment of the background sound and the sound image localization process using the HRTF data are implemented by the server program 101A.

Figure 16:
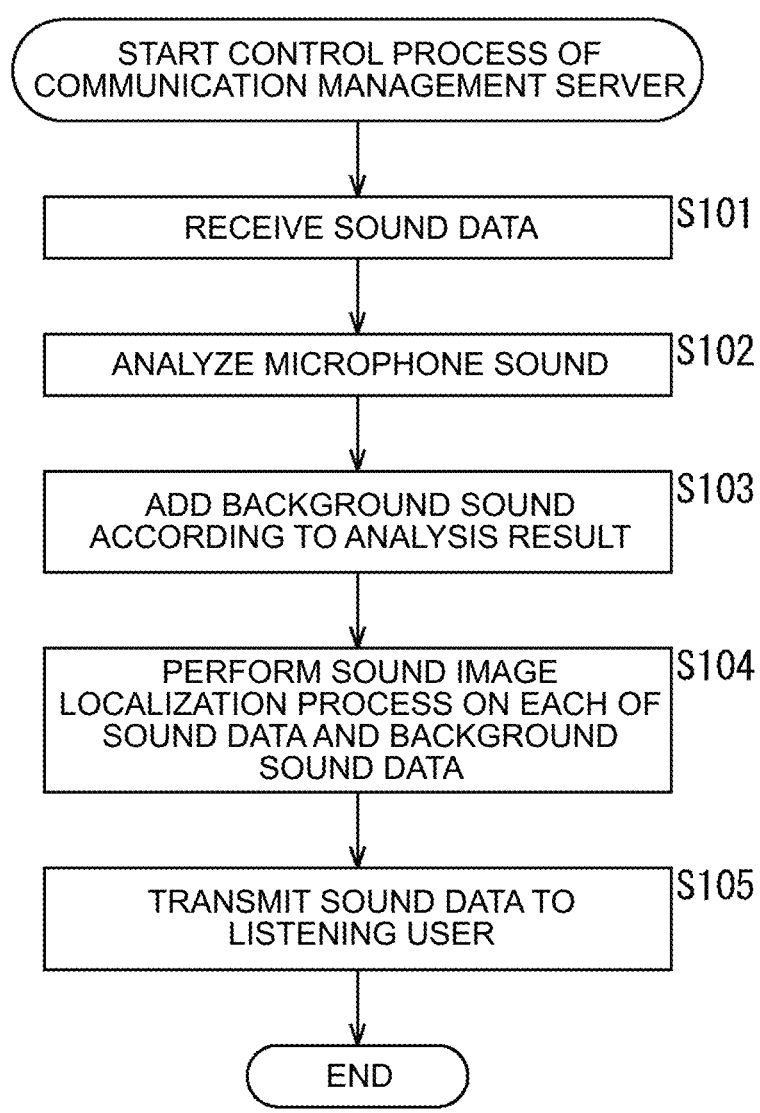
FIG. 16 is a flowchart illustrating a control process of a communication management server.

The control process of the communication management server 1 related to adjustment of the setting of the background sound will be described with reference to a flowchart of FIG. 16.

In Step S101, the sound reception unit 131 receives the sound data transmitted from the client terminal 2 used by the uttering user. The sound data received by the sound reception unit 131 is supplied to the signal processing unit 132.

In Step S102, the signal processing unit 132 analyzes the microphone sound. In the case of the above-described example, the sound volume of the microphone sound, the sound volume of the environmental sound such as noise included in the microphone sound, the feeling of the uttering user, and the content of the utterance are analyzed.

In Step S103, the system sound management unit 136 outputs the sound data of the background sound according to the analysis result of the microphone sound to the sound image localization processing unit 134, and adds the sound data as the sound data to be subjected to the sound image localization process. Sound data of a background sound having a certain sound volume or more, sound data of a background sound of a type that cancels the environmental sound, and sound data of a background sound of a type corresponding to the feeling of the uttering user or the content of the utterance are added.

In Step S104, the sound image localization processing unit 134 reads and acquires the HRTF data according to the positional relationship between the position of the listening user and the position of the uttering user and the HRTF data according to the positional relationship between the position of the listening user and the position of the background sound (the position where the sound image of the background sound is localized) from the HRTF data storage unit 135.

The sound image localization processing unit 134 performs a sound image localization process using the HRTF data for the utterance voice on the sound data of the uttering user, and performs a sound image localization process using the HRTF data for the background sound on the sound data of the background sound.

In Step S105, the sound transmission unit 138 transmits the sound data obtained by the sound image localization process to the client terminal 2 used by the listening user.

Through the above processing, in the client terminal 2 used by the listening user, the sound image of the voice of the uttering user and the sound image of the background sound are localized and felt at predetermined positions. The communication management server 1 can make the utterance voice easy to hear and change the atmosphere of the conference.

Automatic Adjustment of Sound Image Localization According to Utterance Situation In the communication management server 1, the utterance situation including the situation of the uttering user and the situation of the utterance voice is analyzed, and the localization of the sound image of the utterance voice is automatically adjusted. For example, the position at which the sound image of the utterance voice is localized is adjusted.

Figure 17:
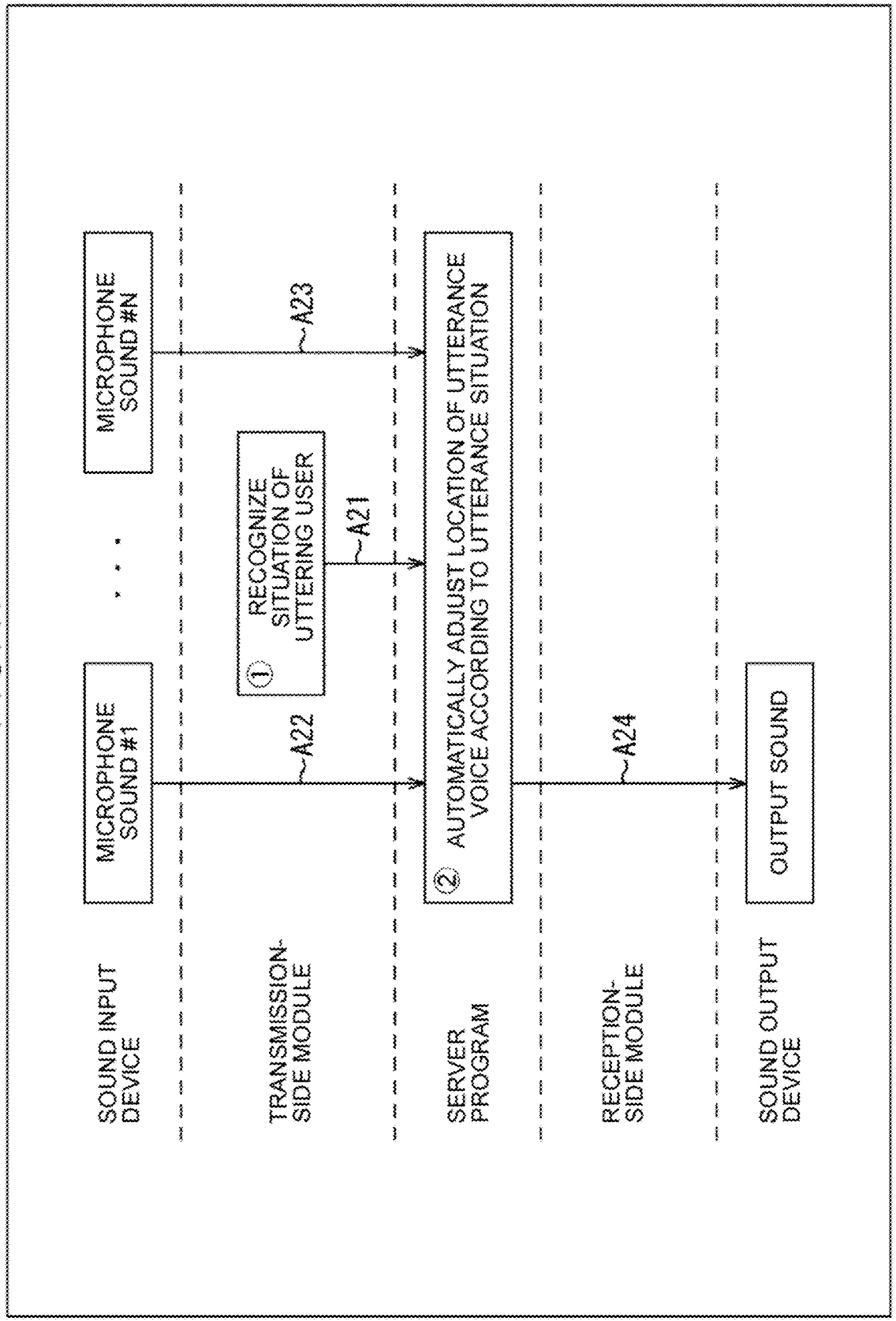
FIG. 17 is a diagram illustrating a flow of processing regarding adjustment of sound image localization according to an utterance situation.

FIG. 17 is a diagram illustrating a flow of processing related to adjustment of sound image localization according to an utterance situation.

In the client terminal 2, the situation of the user (uttering user) is recognized based on an image or the like captured by a camera. The information representing the recognition result of the situation of the uttering user is transmitted from the client terminal 2 to the communication management server 1 as indicated by an arrow A21. The situation of the uttering user may be performed by the communication management server 1 based on the utterance voice.

In a case where microphone sounds are transmitted from the client terminal 2 as indicated by arrows A22 and A23, the communication management server 1 analyzes the situation of the utterance voice based on each microphone sound. Furthermore, the localization of the utterance voice is automatically adjusted according to the utterance situation including the situation of the uttering user and the situation of the utterance voice, and the sound image localization process is performed on the sound data of the uttering user according to the adjusted setting.

The sound data generated by the sound image localization process is transmitted to and output from the client terminal 2 used by each listening user as indicated by an arrow A24.

The adjustment of the localization of the utterance voice is performed, for example, by the sound image localization processing unit 134 (FIG. 11) as follows.

(A) In a case where the opening/closing situation of the user's mouth is recognized in each client terminal 2, the localization position of the sound image is adjusted such that the sound image of the utterance voice of the user (uttering user) determined to be performing the utterance from the opening/closing situation of the mouth can be felt nearby. The opening/closing situation of the mouth is the situation of the uttering user.

In this case, the sound image localization processing unit 134 selects a position near the position of the listening user as the localization position of the sound image of the utterance voice. The sound image localization processing unit 134 performs the sound image localization process based on the HRTF data according to the positional relationship between the position of the listening user and the localization position of the sound image of the utterance voice.

(B) In a case where a plurality of microphone sounds is simultaneously input, the localization position of the sound image is adjusted such that the sound images of the respective utterance voices are felt at positions away from each other. The number of users who are uttering at the same time is the situation of the uttering user.

In this case, the sound image localization processing unit 134 selects a position away by a predetermined distance or more as the localization position of the sound image of the utterance voice of each of the uttering users who are simultaneously uttering. The sound image localization processing unit 134 performs the sound image localization process based on the HRTF data according to the positional relationship between the position of the listening user and the localization position of the sound image of each utterance voice.

In this manner, it is possible to adjust the localization position of the sound image of the utterance voice according to the number of uttering users who are simultaneously speaking.

(C) In a case where the sound volume of the utterance voice of a certain uttering user is small, the localization position of the sound image is adjusted so that the sound image of the utterance voice can be felt nearby. For example, the reference sound volume is set in advance, and the localization position of the sound image is adjusted for the utterance voice having a sound volume smaller than the reference sound volume. The sound volume of the utterance voice is the situation of the utterance voice.

In this case, the sound image localization processing unit 134 selects a position near the position of the listening user as the localization position of the sound image of the utterance voice. The sound image localization processing unit 134 performs the sound image localization process based on the HRTF data according to the positional relationship between the position of the listening user and the localization position of the sound image of the utterance voice. As a result, it is possible to make the utterance voice easy to hear.

In this manner, it is possible to adjust the localization position of the sound image of the utterance voice according to the sound volume of the utterance voice.

(D) In a case where the sound same as the registered sound is detected as the utterance voice, the utterance voice is separated from the microphone sound, and the sound image localization process for localizing the sound image to a predetermined position is performed only on the sound data of the utterance voice. Each user registers his/her voice in the communication management server 1 in advance.

In this case, the sound image localization processing unit 134 separates the utterance voice from the microphone sound, and performs the sound image localization process on the sound data of the utterance voice based on the HRTF data according to the positional relationship between the position of the listening user and the localization position of the sound image of the utterance voice. As a result, it is possible to make the utterance voice easy to hear.

(E) In a case where the analysis of the content (topic) of the utterance is performed based on the microphone sound, grouping is performed for respective utterance voices having different topics, and the localization position of the sound image is adjusted for the utterance voice unit of each group. The content of the utterance is the situation of the utterance voice.

In this case, the sound image localization processing unit 134 selects the same position as the localization position of the sound image of the utterance voice having the same content (the utterance voice of the same group). Furthermore, the sound image localization processing unit 134 selects a position away by a predetermined distance or more as a localization position of the sound image of the utterance voice of each group. The sound image localization processing unit 134 performs the sound image localization process based on the HRTF data according to the positional relationship between the position of the listening user and the localization position of the sound image of the utterance voice.

Since the sound images are localized at positions away from each other for each utterance content, the communication management server 1 can easily distinguish between the utterance contents even in a case where the contents of the conversation are branched.

In this manner, it is possible to adjust the localization position of the sound image of the utterance voice according to the content of the utterance.

Figure 18:
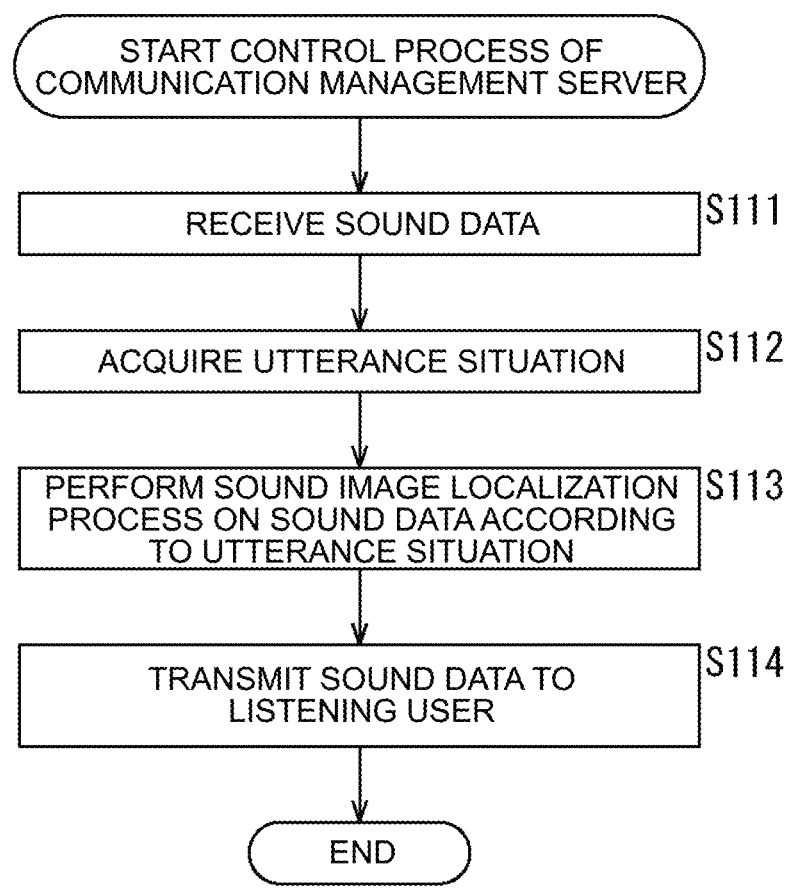
FIG. 18 is a flowchart illustrating a control process of a communication management server.

The control process of the communication management server 1 related to adjustment of sound image localization according to an utterance situation will be described with reference to the flowchart of FIG. 18.

In Step S111, the sound reception unit 131 receives the sound data transmitted from the client terminal 2 used by the uttering user.

In Step S112, the sound image localization processing unit 134 acquires the utterance situation. In other words, the sound image localization processing unit 134 acquires the situation of the uttering user based on the recognition result transmitted from the client terminal 2 and acquires the situation of the utterance voice based on the analysis result supplied from the signal processing unit 132. Only one of the situation of the uttering user and the situation of the utterance voice may be acquired as the utterance situation.

In Step S113, the sound image localization processing unit 134 reads and acquires the HRTF data according to the positional relationship between the position of the listening user and the localization position of the sound image according to the utterance situation from the HRTF data storage unit 135. The sound image localization processing unit 134 performs a sound image localization process using the HRTF data on the sound data of the uttering user so that the sound image of the utterance voice is localized to a position according to the utterance situation.

In Step S114, the sound transmission unit 138 transmits the sound data obtained by the sound image localization process to the client terminal 2 used by the listening user.

With the above processing, in the client terminal 2 used by the listening user, the sound image of the voice of the uttering user is localized and felt at a position corresponding to the utterance situation. The communication management server 1 can make the utterance voice easy to hear and change the atmosphere of the conference.

Dynamic Switching of Sound Image Localization Process

Whether the sound image localization process, which is process of the object audio including rendering and the like, is performed by the communication management server 1 or the client terminal 2 is dynamically switched.

In this case, of the configurations of the communication management server 1 illustrated in FIG. 11, at least the configuration same as that of the sound image localization processing unit 134, the HRTF data storage unit 135, and the 2 ch mix processing unit 137 are provided in the client terminal 2. The configuration similar to that of the sound image localization processing unit 134, the HRTF data storage unit 135, and the 2 ch mix processing unit 137 are realized by, for example, the reception-side module 201A-2.

In a case where the setting of the parameter used for the sound image localization process such as the positional information about the listening user is changed during the conference and the change is reflected in the sound image localization process in real time, the sound image localization process is performed by the client terminal 2. By performing the sound image localization process locally, it is possible to make a response to the parameter change quick.

On the other hand, in a case where the parameter setting is not changed for a certain period of time or more, the sound image localization process is performed by the communication management server 1. By performing the sound image localization process by the server, the amount of data communication between the communication management server 1 and the client terminal 2 can be suppressed.

Figure 19:
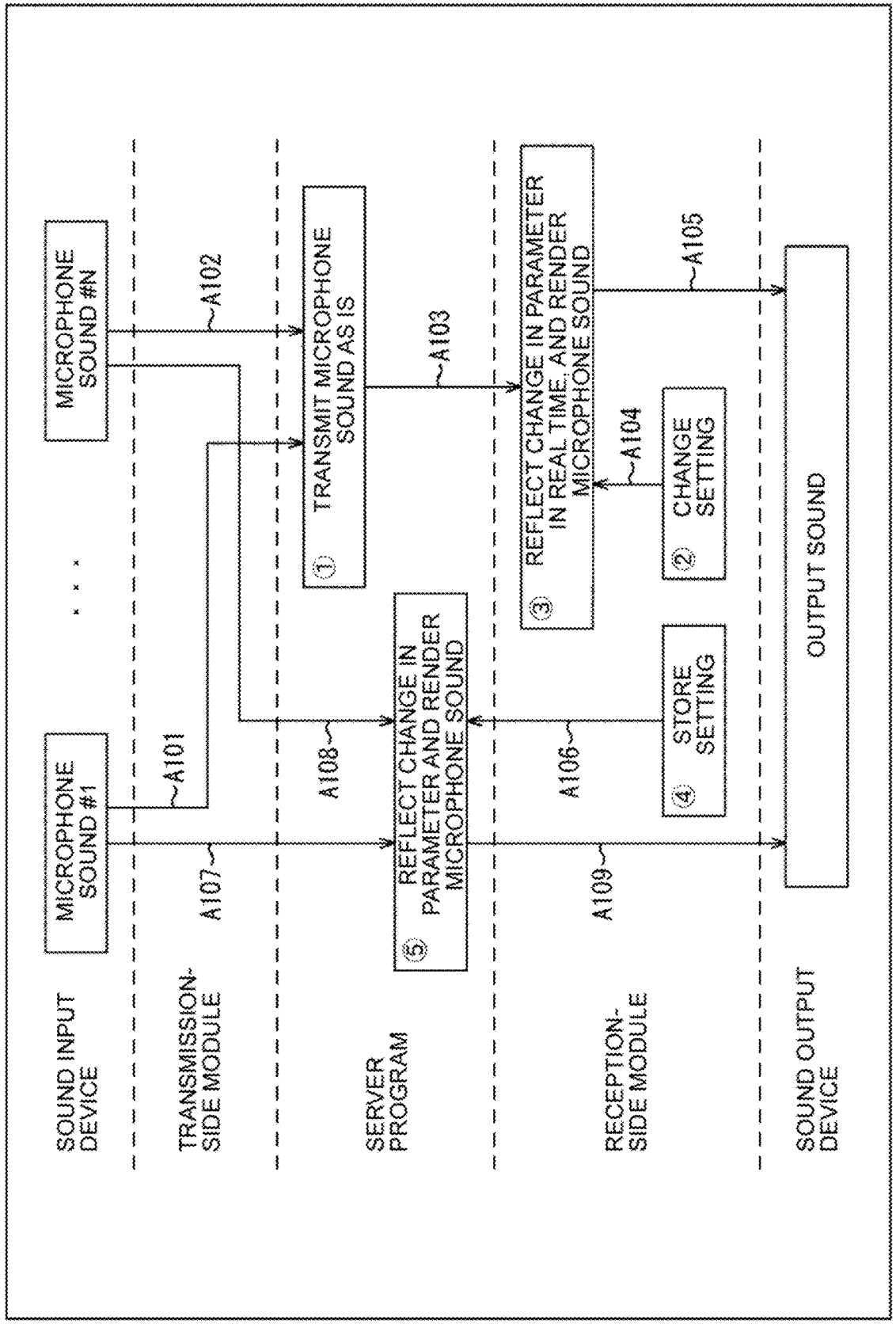
FIG. 19 is a diagram illustrating a flow of processing related to dynamic switching of the sound image localization process.

FIG. 19 is a diagram illustrating a flow of processing related to dynamic switching of the sound image localization process.

In a case where the sound image localization process is performed by the client terminal 2, the microphone sound transmitted from the client terminal 2 as indicated by arrows A101 and A102 is directly transmitted to the client terminal 2 as indicated by arrow A103. The client terminal 2 serving as the transmission source of the microphone sound is the client terminal 2 used by the uttering user, and the client terminal 2 serving as the transmission destination of the microphone sound is the client terminal 2 used by the listening user.

In a case where the setting of the parameter related to the localization of the sound image, such as the position of the listening user, is changed by the listening user as indicated by an arrow A104, the change in the setting is reflected in real time, and the sound image localization process is performed on the microphone sound transmitted from the communication management server 1.

A sound corresponding to the sound data generated by the sound image localization process by the client terminal 2 is output as indicated by an arrow A105.

In the client terminal 2, a change content of the parameter setting is saved, and information representing the change content is transmitted to the communication management server 1 as indicated by an arrow A106.

In a case where the sound image localization process is performed by the communication management server 1, as indicated by arrows A107 and A108, the sound image localization process is performed on the microphone sound transmitted from the client terminal 2 by reflecting the changed parameter.

The sound data generated by the sound image localization process is transmitted to and output from the client terminal 2 used by the listening user as indicated by an arrow A109.

Figure 20:
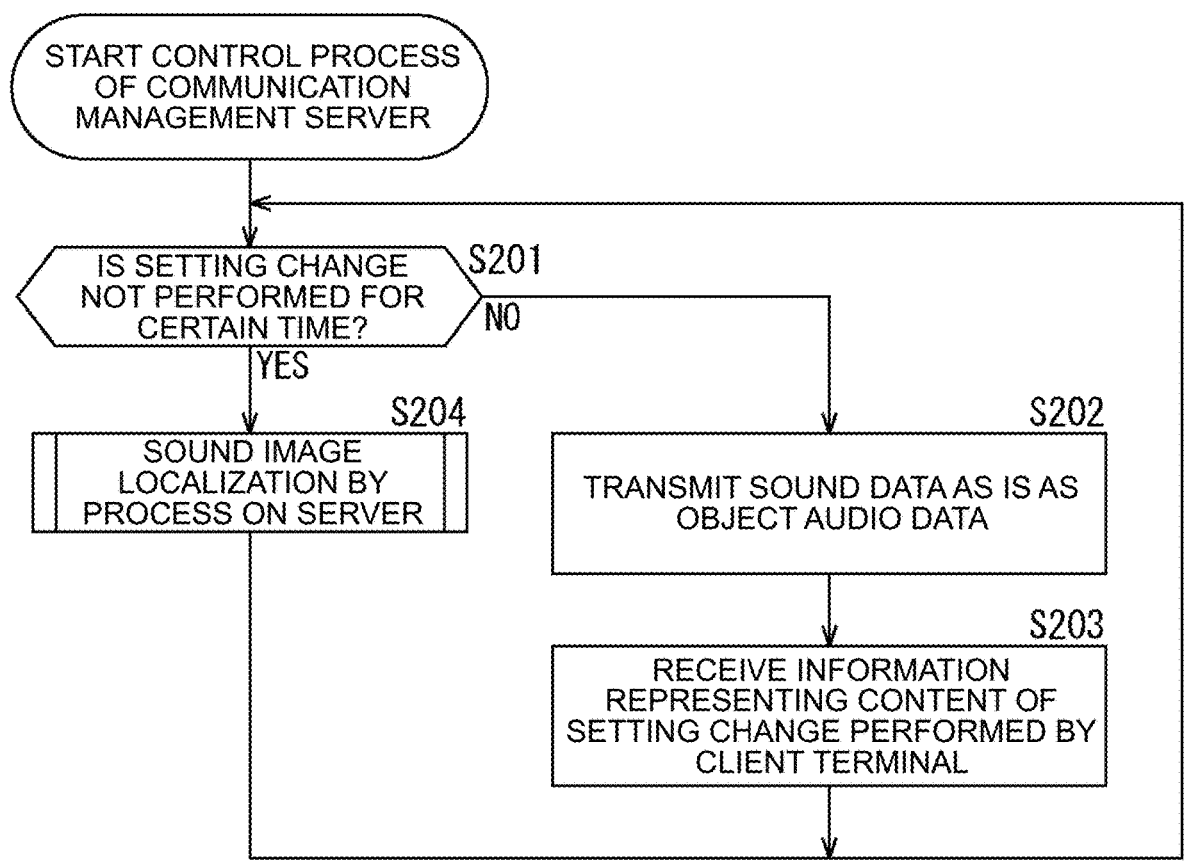
FIG. 20 is a flowchart illustrating a control process of a communication management server.

The control process of the communication management server 1 related to dynamic switching of the sound image localization process will be described with reference to a flowchart of FIG. 20.

In Step S201, it is determined whether the parameter setting change has not been made for a certain period of time or more. This determination is made by the participant information management unit 133 based on, for example, information transmitted from the client terminal 2 used by the listening user.

In a case where it is determined in Step S201 that there is a parameter setting change, in Step S202, the sound transmission unit 138 transmits the sound data of the uttering user received by the participant information management unit 133 as it is to the client terminal 2 used by the listening user. The transmitted sound data is object audio data.

In the client terminal 2, the sound image localization process is performed using the changed setting, and sound is output. Furthermore, information representing the content of the changed setting is transmitted to the communication management server 1.

In Step S203, the participant information management unit 133 receives the information, representing the content of the setting change, transmitted from the client terminal 2. After the positional information about the listening user is updated based on the information transmitted from the client terminal 2, the process returns to Step S201, and the subsequent processes are performed. The sound image localization process performed by the communication management server 1 is performed based on the updated positional information.

On the other hand, in a case where it is determined in Step S201 that there is no parameter setting change, a sound image localization process is performed by the communication management server 1 in Step S204. The processing performed in Step S204 is basically similar to the processing described with reference to FIG. 8.

The above processing is performed not only in a case where the position is changed but also in a case where another parameter such as the setting of the background sound is changed.

Management of Sound Effect Setting

The sound effect setting suitable for the background sound may be stored in a database and managed by the communication management server 1. For example, a position suitable as a position at which a sound image is localized is set for each type of background sound, and the HRTF data corresponding to the set position is stored. Parameters related to another sound effect setting such as reverb may be stored.

FIG. 21 is a diagram illustrating a flow of processing related to management of sound effect setting.

In a case where the background sound is synthesized with the voice of the uttering user, in the communication management server 1, the background sound is played back, and as indicated by an arrow A121, the sound image localization process is performed using the sound effect setting such as HRTF data suitable for the background sound.

The sound data generated by the sound image localization process is transmitted to and output from the client terminal 2 used by the listening user as indicated by an arrow A122.

Modification

Although the conversation held by a plurality of users is assumed to be a conversation in a remote conference, the above-described technology can be applied to various types of conversations as long as the conversation is a conversation in which a plurality of people participates via online, such as a conversation in a meal scene or a conversation in a lecture.

About Program

The above-described series of processing can be executed by hardware or software. In a case where the series of processing is executed by software, a program constituting the software is installed in a computer incorporated in dedicated hardware, a general-purpose personal computer, or the like.

The program to be installed is recorded in the removable medium 111 illustrated in FIG. 10 including an optical disk (compact disc-read only memory (CD-ROM), digital versatile disc (DVD), and the like), a semiconductor memory, and the like. Furthermore, the program may be provided via a wired or wireless transmission medium such as a local area network, the Internet, or digital broadcasting. The program can be installed in the ROM 102 or the storage unit 108 in advance.

Note that the program executed by the computer may be a program in which processing is performed in time series in the order described in the present specification, or may be a program in which processing is performed in parallel or at necessary timing such as when a call is made.

Note that, in the application, the system means a set of a plurality of components (devices, modules (parts), etc.), and it does not matter whether all the components are in the same housing. Therefore, a plurality of devices housed in respective housings and connected via a network is a system and one device in which a plurality of modules is housed in one housing is a system.

The effects described in the present identification are merely examples and are not limited, and other effects may be present.

The embodiments of the present technology are not limited to the above-described embodiments, and various modifications can be made without departing from the gist of the present technology. Although the headphone or the speaker is used as the sound output device, other devices may be used. For example, a normal earphone (inner ear headphone) or an open-type earphone capable of capturing an environmental sound can be used as the sound output device.

Furthermore, for example, the technique can adopt a configuration of cloud computing in which one function is shared and processed by a plurality of devices in cooperation via a network.

Furthermore, each step described in the above-described flowchart can be executed by one device or can be shared and executed by a plurality of devices.

Furthermore, in a case where a plurality of processes is included in one step, the plurality of processes included in the one step can be executed by one device or can be shared and executed by a plurality of devices.

Example of Combination of Configurations

The present technology can also have the following configurations.

(1)

An information processing device comprising:
a storage unit that stores HRTF data corresponding to a plurality of positions based on a listening position; and
a sound image localization processing unit that performs a sound image localization process on sound data of an utterer by using the HRTF data according to an utterance situation of a participant participating in a conversation via a network.

(2)

The information processing device according to (1), further comprising:
a transmission processing unit that transmits sound data, of the utterer, obtained by performing the sound image localization process to a terminal used by each of the participants, the each participant being a listener.

(3)

The information processing device according to (2), wherein
the sound image localization processing unit
performs the sound image localization process using the HRTF data according to a relationship between a position of the listener and a position of the utterer in a virtual space, and
when a localization position of a sound image of an utterance voice that is a voice of the utterer is selected based on the utterance situation, performs the sound image localization process using the HRTF data according to a relationship between a position of the listener and a localization position of a sound image of the utterance voice.

(4)

The information processing device according to (3), wherein
the sound image localization processing unit selects a localization position of a sound image of each of the utterance voices according to the number of utterers who are simultaneously uttering as the utterance situation.

(5)

The information processing device according to (4), wherein
the sound image localization processing unit selects a position away by a predetermined distance or more as a localization position of a sound image of the utterance voice of each of the utterers who are simultaneously uttering.

(6)

The information processing device according to (3), wherein
the sound image localization processing unit selects a localization position of a sound image of each of the utterance voices according to a sound volume of each of the utterance voices as the utterance situation.

(7)

The information processing device according to (6), wherein
the sound image localization processing unit selects a position close to a position of the listener as a localization position of a sound image of the utterance voice having a sound volume smaller than a reference sound volume.

(8)

The information processing device according to (3), wherein
when the utterance situation is a situation in which the participant whose voice has been registered is uttering, the sound image localization processing unit performs the sound image localization process on the sound data of the utterer obtained by separating an environmental sound from an input sound.

(9)

The information processing device according to (3), wherein
the sound image localization processing unit selects a localization position of a sound image of each of the utterance voices according to a content of an utterance as the utterance situation.

(10)

The information processing device according to (9), wherein
the sound image localization processing unit selects a same position as a localization position of a sound image of the utterance voice having a same content.

(11)

An information processing method comprising:
by an information processing device,
storing HRTF data corresponding to a plurality of positions based on a listening position; and
performing a sound image localization process on sound data of an utterer by using the HRTF data according to an utterance situation of a participant participating in a conversation via a network.

(12)

A program for causing a computer to execute the processes of:
storing HRTF data corresponding to a plurality of positions based on a listening position; and
performing a sound image localization process on sound data of an utterer by using the HRTF data according to an utterance situation of a participant participating in a conversation via a network.

(13)

An information processing terminal comprising:
a sound reception unit that stores HRTF data corresponding to a plurality of positions based on a listening position, receives sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputs a voice of the utterer.

(14)

An information processing method comprising:
by the information processing terminal,
storing HRTF data corresponding to a plurality of positions based on a listening position, receiving sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputting a voice of the utterer.

(15)

A program for causing a computer to execute the processes of:

storing HRTF data corresponding to a plurality of positions based on a listening position, receiving sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputting a voice of the utterer.

REFERENCE SIGNS LIST

1 COMMUNICATION MANAGEMENT SERVER
2A to 2D CLIENT TERMINAL
121 INFORMATION PROCESSING UNIT
131 SOUND RECEPTION UNIT
132 SIGNAL PROCESSING UNIT
133 PARTICIPANT INFORMATION MANAGEMENT UNIT
134 SOUND IMAGE LOCALIZATION PROCESSING UNIT
135 HRTF DATA STORAGE UNIT
136 SYSTEM SOUND MANAGEMENT UNIT
137 2 ch MIX PROCESSING UNIT
138 SOUND TRANSMISSION UNIT
201 CONTROL UNIT
211 INFORMATION PROCESSING UNIT
221 SOUND PROCESSING UNIT
222 SETTING INFORMATION TRANSMISSION UNIT
223 USER SITUATION RECOGNITION UNIT
231 SOUND RECEPTION UNIT
233 MICROPHONE SOUND ACQUISITION UNIT

The invention claimed is:

1. An information processing device comprising:
a storage unit that stores HRTF data corresponding to a plurality of positions based on a listening position; and
a sound image localization processing unit that performs a sound image localization process on sound data of an utterer by using the HRTF data according to an utterance situation of a participant participating in a conversation via a network;
a transmission processing unit that transmits sound data, of the utterer, obtained by performing the sound image localization process to a terminal used by each of the participants, each of the participants being a listener, wherein
the sound image localization processing unit performs the sound image localization process using the HRTF data according to a relationship between a position of the listener and a position of the utterer in a virtual space, and
when a localization position of a sound image of an utterance voice that is a voice of the utterer is selected based on the utterance situation, performs the sound image localization process using the HRTF data according to a relationship between a position of the listener and a localization position of a sound image of the utterance voice; and
the sound image localization processing unit selects a localization position of a sound image of each of the utterance voices according to a sound volume of each of the utterance voices as the utterance situation, or the sound image localization processing unit selects a localization position of a sound image of each of the utterance voices according to a content of an utterance as the utterance situation.

2. The information processing device according to claim 1, wherein
the sound image localization processing unit selects a localization position of a sound image of each of the utterance voices according to the number of utterers who are simultaneously uttering as the utterance situation.

3. The information processing device according to claim 2, wherein
the sound image localization processing unit selects a position away by a predetermined distance or more as a localization position of a sound image of the utterance voice of each of the utterers who are simultaneously uttering.

4. The information processing device according to claim 1, wherein
the sound image localization processing unit selects a position close to a position of the listener as a localization position of a sound image of the utterance voice having a sound volume smaller than a reference sound volume.

5. The information processing device according to claim 1, wherein
when the utterance situation is a situation in which the participant whose voice has been registered is uttering, the sound image localization processing unit performs the sound image localization process on the sound data of the utterer obtained by separating an environmental sound from an input sound.

6. The information processing device according to claim 1, wherein
the sound image localization processing unit selects a same position as a localization position of a sound image of the utterance voice having a same content.

7. An information processing method comprising:
by an information processing device,
storing HRTF data corresponding to a plurality of positions based on a listening position; and
performing a sound image localization process on sound data of an utterer by using the HRTF data according to an utterance situation of a participant participating in a conversation via a network; and
transmitting sound data, of the utterer, obtained by performing the sound image localization process to a terminal used by each of the participants, each of the participants being a listener, wherein
performing the sound image localization process includes using the HRTF data according to a relationship between a position of the listener and a position of the utterer in a virtual space, and
when a localization position of a sound image of an utterance voice that is a voice of the utterer is selected based on the utterance situation, performing the sound image localization process includes using the HRTF data according to a relationship between a position of the listener and a localization position of a sound image of the utterance voice; and selecting a localization position of a sound image of each of the utterance voices according to a sound volume of each of the utterance voices as the utterance situation, or selecting a localization position of a sound image of each of the utterance voices according to a content of an utterance as the utterance situation.

8. A non-transitory computer readable medium storing a program for causing a computer to execute the processes of:

storing HRTF data corresponding to a plurality of positions based on a listening position; and performing a sound image localization process on sound data of an utterer by using the HRTF data according to an utterance situation of a participant participating in a conversation via a network; and transmitting sound data, of the utterer, obtained by performing the sound image localization process to a terminal used by each of the participants, each of the participants being a listener, wherein performing the sound image localization process includes using the HRTF data according to a relationship between a position of the listener and a position of the utterer in a virtual space, and when a localization position of a sound image of an utterance voice that is a voice of the utterer is selected based on the utterance situation, performing the sound image localization process includes using the HRTF data according to a relationship between a position of the listener and a localization position of a sound image of the utterance voice; and selecting a localization position of a sound image of each of the utterance voices according to a sound volume of each of the utterance voices as the utterance situation, or selecting a localization position of a sound image of each of the utterance voices according to a content of an utterance as the utterance situation.

9. An information processing terminal comprising:

a sound reception unit that stores HRTF data corresponding to a plurality of positions based on a listening position, receives sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputs a voice of the utterer; and a transmission processing unit that transmits the sound data, of the utterer obtained by performing the sound image localization process to a terminal used by each of the participants, the each participant being a listener, wherein the sound image localization processing unit performs the sound image localization process using the HRTF data according to a relationship between a position of the listener and a position of the utterer in a virtual space, and when a localization position of a sound image of an utterance voice that is a voice of the utterer is selected based on the utterance situation, performs the sound image localization process using the HRTF data according to a relationship between a position of the listener and a localization position of a sound image of the utterance voice; and the sound image localization processing unit selects a localization position of a sound image of each of the utterance voices according to a sound volume of each of the utterance voices as the utterance situation, or the sound image localization processing unit selects a localization position of a sound image of each of the utterance voices according to a content of an utterance as the utterance situation.

10. An information processing method comprising:

by the information processing terminal, storing HRTF data corresponding to a plurality of positions based on a listening position, receiving sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputting a voice of the utterer; and transmitting sound data, of the utterer, obtained by performing the sound image localization process to a terminal used by each of the participants, each of the participants being a listener, wherein performing the sound image localization process includes using the HRTF data according to a relationship between a position of the listener and a position of the utterer in a virtual space, and when a localization position of a sound image of an utterance voice that is a voice of the utterer is selected based on the utterance situation, performing the sound image localization process includes using the HRTF data according to a relationship between a position of the listener and a localization position of a sound image of the utterance voice; and selecting a localization position of a sound image of each of the utterance voices according to a sound volume of each of the utterance voices as the utterance situation, or selecting a localization position of a sound image of each of the utterance voices according to a content of an utterance as the utterance situation.

11. A non-transitory computer readable medium storing a program for causing a computer to execute the processes of:

storing HRTF data corresponding to a plurality of positions based on a listening position, receiving sound data, of an utterer, obtained by performing a sound image localization process, the sound data being transmitted from an information processing device that performs the sound image localization process on sound data of the utterer by using the HRTF data according to an utterance situation of a participant participating in a conversation via a network, and outputting a voice of the utterer; and transmitting sound data, of the utterer, obtained by performing the sound image localization process to a terminal used by each of the participants, each of the participants being a listener, wherein performing the sound image localization process includes using the HRTF data according to a relationship between a position of the listener and a position of the utterer in a virtual space, and when a localization position of a sound image of an utterance voice that is a voice of the utterer is selected based on the utterance situation, performing the sound image localization process includes using the HRTF data according to a relationship between a position of the listener and a localization position of a sound image of the utterance voice; and selecting a localization position of a sound image of each of the utterance voices according to a sound volume of each of the utterance voices as the utterance situation, or selecting a localization position of a sound image of each of the utterance voices according to a content of an utterance as the utterance situation.

* * * * *